US012655263B2

(12) United States Patent
Andreasson et al.

(10) Patent No.: US 12,655,263 B2
(45) Date of Patent: Jun. 16, 2026

(54) THERMALLY EXPANDABLE CELLULOSE-BASED MICROSPHERES HAVING LOW EXPANSION TEMPERATURES

(71) Applicant: NOURYON CHEMICALS INTERNATIONAL B.V., Amsterdam (NL)

(72) Inventors: Bo Andreasson, Sundsvall (SE); Roel Wijtmans, Sundsvall (SE); Elwin Schomaker, Arnhem (NL); Helena Bergenudd, Stockvik (SE)

(73) Assignee: NOURYON CHEMICALS INTERNATIONAL B.V., Amsterdam (NL)

( * ) Notice: Subject to any disclaimer, the term of this patent is extended or adjusted under 35 U.S.C. 154(b) by 706 days.

(21) Appl. No.: 17/999,236

(22) PCT Filed: May 19, 2021

(86) PCT No.: PCT/EP2021/063316
§ 371 (c)(1),
(2) Date: Nov. 18, 2022

(87) PCT Pub. No.: WO2021/234010
PCT Pub. Date: Nov. 25, 2021

(65) Prior Publication Data

US 2023/0220177 A1 Jul. 13, 2023

(30) Foreign Application Priority Data

May 20, 2020 (EP) .................................... 20175791
Feb. 22, 2021 (EP) .................................... 21158552

(51) Int. Cl.
*C08J 9/18* (2006.01)
*B01J 13/04* (2006.01)
(Continued)

(52) U.S. Cl.
CPC ............... *C08J 9/18* (2013.01); *B01J 13/043* (2013.01); *B01J 13/14* (2013.01); *C08J 9/0061* (2013.01);
(Continued)

(58) Field of Classification Search
CPC .......................................................... C08J 9/18
See application file for complete search history.

(56) References Cited

U.S. PATENT DOCUMENTS 3,615,972 A 10/1971 Morehouse et al.
4,826,886 A * 5/1989 Indyke ............... C08G 73/1042
521/184

(Continued)

FOREIGN PATENT DOCUMENTS

CN 103003406 A 3/2013
CN 111511821 A 8/2020

(Continued)

OTHER PUBLICATIONS

Nishio et al; "Cellulose alkyl ester/vinyl polymer blends: effects of butyryl substitution and intramolecular copolymer composition on the miscibility", Cellulose, 2006 (13), 245-259.

(Continued)

*Primary Examiner* — Irina Krylova
(74) *Attorney, Agent, or Firm* — Ingrassia, Fisher & Lorenz, LLP

(57) ABSTRACT

The present disclosure relates to thermally expandable microspheres comprising a polymeric shell surrounding a hollow core, wherein the hollow core comprises a blowing agent, and the polymeric shell comprises a carboxylate-functionalised cellulose, wherein the thermally expandable microspheres have a temperature at which expansion starts, $T_{Start}$, of from 80° C. to less than 135° C. The present disclosure further relates to a process for preparing expand- (Continued)

able microspheres as well as to thermally expandable microspheres obtained by such process, the process comprising mixing a carboxylate-functionalised cellulose, an organic solvent, a blowing agent and, optionally, a polymer shell enhancer and then spraying the thus obtained mixture into a drying equipment to produce the thermally expandable microspheres having a polymeric shell surrounding a hollow core, in which the polymeric shell comprises the carboxylate-functionalised cellulose, and the hollow core comprises the blowing agent.

20 Claims, 2 Drawing Sheets

(51) Int. Cl.

| | |
|---|---|
| ***B01J 13/14*** | (2006.01) |
| ***C08J 9/00*** | (2006.01) |
| ***C08J 9/14*** | (2006.01) |
| ***C08J 9/16*** | (2006.01) |
| ***C08J 9/20*** | (2006.01) |

(52) U.S. Cl.

CPC ................. *C08J 9/141* (2013.01); *C08J 9/16* (2013.01); *C08J 9/20* (2013.01); *C08J 2203/14* (2013.01); *C08J 2203/22* (2013.01); *C08J 2301/14* (2013.01); *C08J 2367/02* (2013.01)

(56) References Cited

U.S. PATENT DOCUMENTS

| | | | | |
|---|---|---|---|---|
| 5,003,086 | A * | 3/1991 | Stults | C07C 65/24 549/241 |
| 6,617,364 | B2 * | 9/2003 | Soane | B01J 13/20 521/149 |
| 2001/0044477 | A1 | 11/2001 | Soane et al. | |
| 2002/0004059 | A1 | 1/2002 | Van Koppenhagen | |
| 2009/0155371 | A1 | 6/2009 | Xavier | |
| 2010/0234233 | A1 * | 9/2010 | Sannino | C08B 15/005 523/105 |
| 2011/0123807 | A1 * | 5/2011 | Jun | B01J 13/14 428/407 |
| 2013/0004012 | A1 | 1/2013 | Huang | |
| 2013/0040125 | A1 * | 2/2013 | Eberstaller | C08J 9/0038 428/407 |
| 2013/0071453 | A1 | 3/2013 | Sojka et al. | |
| 2015/0252313 | A1 | 9/2015 | Fernandez Prieto et al. | |
| 2018/0273697 | A1 * | 9/2018 | Medeiros | C08J 3/075 |
| 2019/0085098 | A1 * | 3/2019 | Tripathi | C08B 15/005 |
| 2020/0094440 | A1 | 3/2020 | Lee | |
| 2020/0332085 | A1 | 10/2020 | Ebe et al. | |

FOREIGN PATENT DOCUMENTS

| | | | |
|---|---|---|---|
| EP | 1288272 | A1 | 3/2003 |
| EP | 2327475 | A2 | 6/2011 |
| JP | S59173132 | A | 10/1984 |
| JP | 2002-060545 | A | 2/2002 |
| KR | 20100087036 | A | 8/2010 |
| KR | 20140070139 | A | 6/2014 |
| WO | 0037547 | A2 | 6/2000 |
| WO | 2004056549 | A1 | 7/2004 |
| WO | 2007091960 | A1 | 8/2007 |
| WO | 2012151596 | A2 | 11/2012 |
| WO | 2014198532 | A1 | 12/2014 |
| WO | 2015178329 | A1 | 11/2015 |
| WO | 2016091847 | A1 | 6/2016 |
| WO | 2019043235 | A1 | 3/2019 |
| WO | 2019101749 | A1 | 5/2019 |
| WO | 2020099440 | A1 | 5/2020 |
| WO | 2020152362 | A1 | 7/2020 |
| WO | 2021234010 | A1 | 11/2021 |

OTHER PUBLICATIONS

Victor A. Oliveira et al., Hydrogels of Cellulose Acetate Crosslinked With Pyromellitic Dianhydride—Part I: Synthesis and Swelling Kinetics, Quim. Nova, 2013, vol. 36, No. 1, p. 102-106.

Wang et al., “Preparation of cellulose based microspheres by combining spray coagulating with spray drying” Carbohydrate Polymers Oct. 13, 2014.

* cited by examiner

THERMALLY EXPANDABLE CELLULOSE-BASED MICROSPHERES HAVING LOW EXPANSION TEMPERATURES

CROSS-REFERENCE TO RELATED APPLICATION

This application is a U.S. National-Stage entry under 35 U.S.C. § 371 based on International Application No. PCT/EP2021/063316, filed May 19, 2021 which was published under PCT Article 21(2) and which claims priority to European Application No. 20175791.1, filed May 20, 2020 and European Application No. 21158552.6, filed Feb. 22, 2021, which are all hereby incorporated in their entirety by reference.

TECHNICAL FIELD

The present disclosure relates to thermally expandable microspheres made from cellulose-based biopolymers having low expansion temperatures, and also to a process for their production.

BACKGROUND

Thermally expandable microspheres are known in the art, and are described for example in U.S. Pat. No. 3,615,972, WO 00/37547 and WO2007/091960. A number of examples are sold under the trade name Expancel®. They can be expanded to form extremely low weight and low density fillers, and find use in applications such as foamed or low density resins, paints and coatings, cements, inks and crack fillers. Consumer products that often contain expandable microspheres include lightweight shoe soles (for example for running shoes), textured coverings such as wallpaper, solar reflective and insulating coatings, food packaging sealants, wine corks, artificial leather, foams for protective helmet liners, and automotive weather strips.

Thermally expandable polymer microspheres usually comprise a thermoplastic polymeric shell, with a hollow core comprising a blowing agent which expands on heating. Examples of blowing agents include low boiling hydrocarbons or halogenated hydrocarbons, which are liquid at room temperature, but which vapourise on heating. To produce expanded microspheres, the expandable microspheres are heated, such that the thermoplastic polymeric shell softens, and the blowing agent vapourises and expands, thus expanding the microsphere. Typically, the microsphere diameter can increase between 1.5 and 8 times during expansion. Expandable microspheres are marketed in various forms, e.g. as dry free-flowing particles, as aqueous slurry or as a partially dewatered wet cake.

Expandable microspheres can be produced by polymerizing ethylenically unsaturated monomers in the presence of a blowing agent, for example using a suspension-polymerisation process. Typical monomers include those based on acrylates, acrylonitriles, acrylamides, vinylidene dichloride and styrenes. A problem associated with such thermoplastic polymers is that they are typically derived from petrochemicals, and are not derived from sustainable sources. In addition, many polymers are non-biodegradeable, or at least biodegrade so slowly that they risk cumulative build-up in the environment. However, it is not necessarily easy merely to replace the monomers with more sustainable-derived alternatives, since it is necessary to ensure that acceptable expansion performance is maintained. For example, the polymer must have the right surface energy to get a core-shell particle in a suspension polymerization reaction so that the blowing agent is encapsulated. In addition, the produced polymer must have good gas barrier properties to be able to retain the blowing agent. Further, the polymer must have suitable viscoelastic properties above glass transition temperature $T_g$ so that the shell can be stretched out during expansion. Therefore, replacement of conventional monomers by bio-based monomers is not easy.

Expandable microspheres have been described, in which at least a portion of the monomers making up the thermoplastic shell are bio-based, being derivable from renewable sources.

WO2019/043235 describes polymers comprising lactone monomers with general formula:

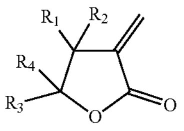

where $R_1$-$R_4$ are each independently selected from H and $C_{1-4}$ alkyl.

WO2019/101749 describes copolymers comprising itaconate dialkylester monomers of general formula:

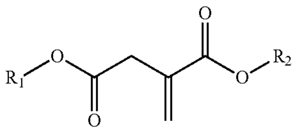

where each of $R_1$ and $R_2$ are separately selected from alkyl groups.

Published patent application WO 2020/099440 (PCT/EP2019/081076) discloses thermally expandable microspheres made from cellulose-based biopolymers. The polymeric shell of these microspheres comprises a carboxylate-functionalised cellulose having a glass transition temperature ($T_g$) of at least 125° C. All microspheres exemplified in this application have a temperature at which expansion starts, $T_{Start}$, of at least 135° C. or higher. However, for some applications, there is a need for microspheres which have a lower $T_{Start}$.

Hence, there remains a need for alternative thermoplastic expandable microspheres in which the thermoplastic polymer shell is, at least in part, derived from sustainable sources. Moreover, there further remains a need for providing expandable microspheres in which the thermoplastic polymer shell is, at least in part, derived from sustainable sources and wherein the expandable microspheres have low expansion temperatures and other desirable expansion characteristics such as for instance a desirably low density of the expanded microspheres.

Moreover, it would be desirable if such expandable microspheres derived from sustainable sources have sufficient or even improved storage stability. The present disclosure is, therefore, directed to finding thermally expandable polymeric microspheres having desirable expansion characteristics such as for instance a desirably low density of the expanded microspheres at low expansion temperatures (i.e. temperature at which expansion starts) by using bio-derived polymers and which, at the same time, preferably have sufficient or even improved storage stability.

BRIEF SUMMARY

The present disclosure is directed to thermally expandable microspheres comprising a polymeric shell surrounding a hollow core, wherein the hollow core comprises a blowing agent, and the polymeric shell comprises a carboxylate-functionalised cellulose, wherein the thermally expandable microspheres have a temperature at which expansion starts, $T_{Start}$, of from 80° C. to less than 135° C.

The present disclosure is also directed to a process for preparing expandable microspheres as well as to thermally expandable microspheres obtained by such process, the process comprising mixing a carboxylate-functionalised cellulose, an organic solvent, a blowing agent and, optionally, a polymer shell enhancer in the form of crosslinker or a hydrogen bond donor, and then spraying the thus obtained mixture into a drying equipment to produce the thermally expandable microspheres having a polymeric shell surrounding a hollow core, in which the polymeric shell comprises the carboxylate-functionalised cellulose, and the hollow core comprises the blowing agent.

BRIEF DESCRIPTION OF DRAWINGS

The present disclosure will hereinafter be described in conjunction with the following drawing figures, wherein like numerals denote like elements, and.

DETAILED DESCRIPTION

Figure 1A:
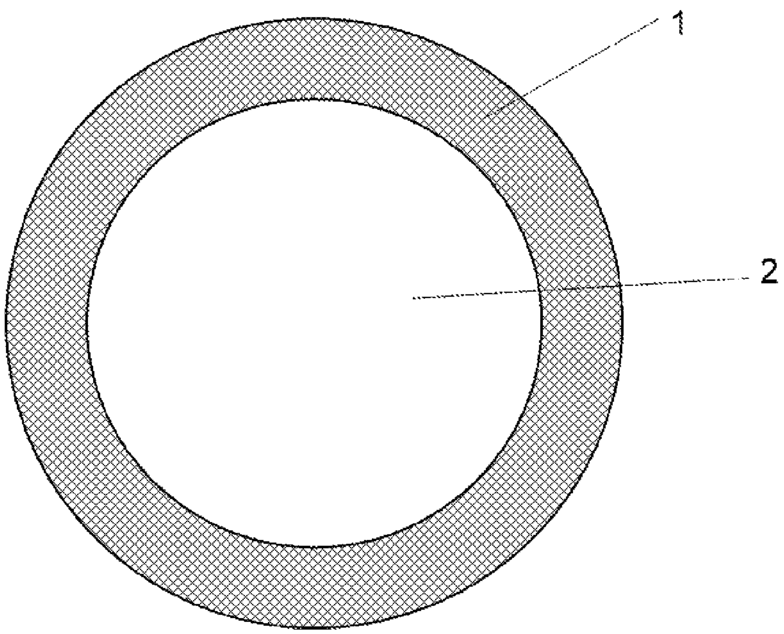
FIG. 1 illustrates the difference between a single core (FIG. 1A) and multi-core (FIG. 1B) microsphere.

The following detailed description is merely exemplary in nature and is not intended to limit the disclosure or the application and uses of the subject matter as described herein. Furthermore, there is no intention to be bound by any theory presented in the preceding background or the following detailed description. It is to be appreciated that all numerical values as provided herein, save for the actual examples, are approximate values with endpoints or particular values intended to be read as "about" or "approximately" the value as recited.

One aspect of the present disclosure are thermally expandable microspheres comprising a polymeric shell surrounding a hollow core, wherein the hollow core comprises a blowing agent, and the polymeric shell comprises a carboxylate-functionalised cellulose, wherein the thermally expandable microspheres have a temperature at which expansion starts, $T_{Start}$, of from 80° C. to less than 135° C.

The expandable microspheres are based on a polymeric shell comprising a carboxylate-functionalised cellulose. The functional group is a carboxylate group, or more than one carboxylate group, which are typically selected from $C_1$ to $C_{12}$ carboxylates. Thus, the term "carboxylate-functionalised cellulose" means that the cellulose comprises at least one carboxylate group. The carboxylate moiety forms part of the link between the carboxylate functional group and the cellulose, i.e. the cellulose is linked to the carboxylate functional group via an ester link.

The polymeric shell can comprise or consist of one or more polymeric components, in which at least one component, more than one component or all polymeric components are selected from such carboxylate-functionalised celluloses. Where there the shell comprises polymers other than those described herein (i.e. carboxylate-functionalised cellulose), their content is typically less than 50 wt %, for example less than 30 wt %, or less than 10 wt %, such as 9 wt % or below, 5 wt % or below or even 2 wt % or below. These percentages are based on the total polymer content of the shell.

In embodiments, the carboxylate functional group on the carboxylate-functionalised cellulose can be represented by formula (1).

Formula (1)

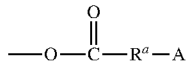

In Formula (1), A is selected from —H, —OH, —$OR^b$, —C(O)OH and —C(O)$OR^b$. In embodiments, A is selected from —H and —C(O)OH.

$R^a$ can be absent, i.e. A can be directly attached to the C═O group. However, where present, $R^a$ can be selected from saturated or unsaturated aliphatic groups having from 1 to 11 carbon atoms, and which can be linear, branched or cyclic.

$R^a$ can also be selected from 5- and 6-membered aromatic rings.

$R^a$ can optionally comprise one or more substituents selected from —OH, halide, $C_{1-4}$ alkyl, and $C_{1-4}$ alkoxy, where the $C_{1-4}$ alkyl and $C_{1-4}$ alkoxy groups are optionally substituted with one or more groups selected from halide and —OH.

$R^a$ in embodiments comprises from 1 to 7 carbon atoms, for example from 1 to 5, or from 1 to 3 carbon atoms.

$R^b$ on each occurrence is independently selected from a $C_{1-4}$ alkyl group, for example a $C_{1-2}$, alkyl group, optionally with one or more substituents selected from halide and —OH groups. In embodiments, the $C_{1-4}$ alkyl group or $C_{1-2}$ alkyl groups are unsubstituted.

In embodiments, $R^a$ can be a saturated linear or branched aliphatic $$C_vR^c_{2v}$$

group or a cyclic $$C_wR^c_{2w-2}$$

aliphatic group. v is an integer in the range of from 1 to 11, for example in the range of from 1 to 8, such as from 1 to 6 or from 1 to 4. w is an integer in the range of from 3 to 11, for example from 4 to 6.

$R^c$ on each occurrence is independently selected from H, —OH, halide, $C_{1-4}$ alkyl, and $C_{1-4}$ alkoxy, where the $C_{1-4}$ alkyl and $C_{1-4}$ alkoxy groups are optionally substituted with one or more groups selected from halide and —OH.

In other embodiments, $R^a$ can be an unsaturated linear or branched aliphatic $$C_xR^c_{2x-2y}$$

group comprising "y" double bonds. x is an integer in the range of from 2 to 11, for example from 2 to 6 or from 2 to 4. y represents the number of double bonds, and is typically 1 or 2.

In further embodiments, $R^a$ can be an unsaturated cyclic aliphatic $$C_wR^c_{2w-2y-2}$$

group comprising "y" double bonds, where y is typically 1 or 2.

In still further embodiments, $R^a$ can be a $$C_zR^c_{z-2}$$

aromatic group. z is an integer selected from 5 and 6.

In still further embodiments, $R^a$ can be a linear or branched aliphatic group comprising a cyclic aliphatic or aromatic ring. Thus, $R^a$ can be a $$C_pR^c_{2p-2q}-E-C_rR^c_{2r-2s}$$

group having no more than 11 carbon atoms, where E is $$C_wR^c_{2w-2},\ C_wR^c_{2w-2y-2},\ \text{or}\ C_zR^c_{z-2}$$

as defined above. p and r are each independently a whole number from 0 to 8, where p+r is at least 1. q and s are each the number of double bonds in the respective non-cyclic aliphatic component. In embodiments, each of q and s are independently selected from 0, 1 and 2.

Halides are typically selected from F and Cl. In embodiments, however, the functional group is halide-free, such that there are no halides in groups A, $R^a$, $R^b$ and $R^c$.

In embodiments, at least one $R^c$ group is H. In other embodiments no more than two $R^c$ groups are other than H, and in further embodiments, no more than one $R^c$ group is other than H. In still further embodiments, all $R^c$ groups are H.

In the above definitions of $R^a$, $R^b$ and $R^c$, where there is more than one —OH substituent, there is typically no more than one —OH substituent per carbon atom.

In certain embodiments, $R^a$ is an optionally substituted $C_1$-$C_8$ aliphatic (alkylene) group. In other embodiments, $R^a$ is an optionally substituted $C_6$ aromatic ring. In further embodiments, $R^a$ is unsubstituted.

In embodiments, the functional group on the cellulose substituent is selected from acetate, propionate, butyrate, pentanoate, hexanoate, heptanoate, octanoate and phthalate. In further embodiments, it is selected from acetate, propionate and butyrate, preferably from propionate and butyrate.

The degree of substitution (DS) of the hydroxyl groups of the cellulose by the one or more carboxylate groups can be in the range of from 0.9 to 3.5, and in embodiments is in the range of from 1.5 to 3.5, for example in the range of from 2.5 to 3.3.

Optionally, other functional groups may be present in the functionalised cellulose. For example, —OH groups on the cellulose molecule that are not already substituted with carboxylate-functionality can be replaced by an alkoxy group, or more than one alkoxy group, e.g. selected from $C_1$ to $C_6$ alkoxy groups. In other embodiments, although less preferred, the —OH group can be replaced with a halide group, for example F or Cl. Where such other functional groups are present, they are in lower molar quantities than the one or more carboxylate groups. In embodiments, the degree of substitution of the cellulose by other functional groups is no more than 1, for example no more than 0.5 or no more than 0.2. In further embodiments, the degree of substitution by groups other than carboxylate groups is no more than 0.1.

In embodiments, the carboxylate-functionalised cellulose comprises propionate or butyrate groups, preferably propionate groups.

In embodiments, the cellulose can be functionalised with two or more different carboxylate groups, and preferably is functionalised with two different carboxylate groups. In preferred embodiments, the carboxylate-functionalised cellulose is functionalised with at least two, preferably two, different carboxylate functionalities which are carboxylate functionalities as described above. In a more preferred embodiment, the carboxylate-functionalised cellulose is functionalised with at least an acetate group and at least an additional group selected from propionate groups, butyrate groups, pentanoate groups, hexanoate groups, heptanoate groups, octanoate groups and phthalate groups. In an even more preferred embodiment, the carboxylate-functionalised cellulose is functionalised with at least an acetate group and at least an additional group selected from butyrate groups and propionate groups (i.e. in the additional carboxylate groups, $R^a$ is an aliphatic and unsubstituted $C_2$ or $C_3$ group, and A is H). For instance, the carboxylate-functionalised cellulose is functionalised with an acetate group and a butyrate group or the carboxylate-functionalised cellulose is functionalised with an acetate group and a propionate group.

In embodiments, the glass transition temperature ($T_g$) of the carboxylate-functionalised cellulose that forms the shell of the microspheres or at least part of the shell of the microspheres is at least 80° C. The $T_g$ can be measured using differential scanning calorimetry (DSC), for example using the method described by Nishio et al; Cellulose, 2006 (13), 245-259, in which 5 mg sample is heated for a first time at a rate of 20° C./min under a nitrogen atmosphere from ambient temperature (25° C.) to 240° C., and then immediately quenched to −50° C., before being heated for a second time from −50° C. to 240° C. at 20° C./min under a nitrogen atmosphere, the $T_g$ calculation being based on the second heating cycle.

In further embodiments, the $T_g$ of the carboxylate-functionalised cellulose is at least 90° C., for example at least 100° C., at least 110° C. or at least 120° C. In embodiments, the $T_g$ of the carboxylate-functionalised cellulose is no more than 150° C., for example no more than 135° C., or no more than 125° C., such as 124° C. or less. In embodiments, the $T_g$ is in the range of from 80 to 150° C., for example in the range of from 80 to 135° C., from 80 to 125° C. or from 80 to 124° C. In further embodiments, the $T_g$ is in the range of from 90 to 124° C., for example from 100 to 124° C. or from 110 to 124° C.

The melting point of the carboxylate-functionalised cellulose is typically above the $T_g$ value, and in embodiments is above 125° C. In embodiments, the melting point is above 150° C. The melting point is typically no more than 270° C., for example no more than 250° C.

The $T_g$ and the melting point of the carboxylate-functionalised cellulose can be modified or controlled by varying the functional groups on the functionalised cellulose or by varying the molecular weight.

The thermally expandable microspheres are hollow, in which the shell comprises the carboxylate-functionalised cellulose, and the hollow centre or core comprises one or more blowing agents. The carboxylate-functionalised celluloses used to prepare the microspheres typically have a density of 1.1-1.35 g/$cm^3$. In the expanded microspheres, the density is typically less than 1 g/$cm^3$, and is suitably in the range of from 0.005 to 0.8 g/$cm^3$, or from 0.01 to 0.6 g/$cm^3$. In further embodiments, the density of the expanded microspheres is in the range of from 0.01 to 0.4 g/$cm^3$, such as for instance in the range from 0.01 to 0.2 g/$cm^3$ and preferably in the range from 0.01 to 0.15 g/$cm^3$. Higher densities, particularly densities of 1 g/$cm^3$ or more, generally mean that the microsphere samples are not suitable for use.

In embodiments, the number average molecular weight ($M_n$) of the functionalised cellulose used to form the microspheres is in the range of from 1 000 to 700 000, for example in the range of from 2 000 to 500 000. In embodiments, it is in the range of from 10 000 to 100 000, for example from 10 000 to 80 000.

Examples of suitable carboxylate-functionalised celluloses are cellulose acetate propionate (CAP) and cellulose acetate butyrate (CAB), particularly cellulose acetate propionate (CAP) and cellulose acetate butyrate (CAB) having a number average molecular weight ($M_n$) in the range of from 2,000 to 100,000 Da, such as in the range of 2,000 to 80,000 Da, preferably in the range of from 2,000 to 30,000 Da and more preferably in the range of 10,000 to 30,000 Da.

Most preferred carboxylate-functionalised celluloses are cellulose acetate propionate (CAP) having a number average molecular weight ($M_n$) in the range of from 2,000 to 100,000 Da, such as within the range of 2,000 to 80,000 Da, preferably in the range of from 2,000 to 30,000 Da, and more preferably in the range of from 10,000 to 30,000 Da, and most preferably in the range of from 10,000 to 25,000 Da.

Figure 2:
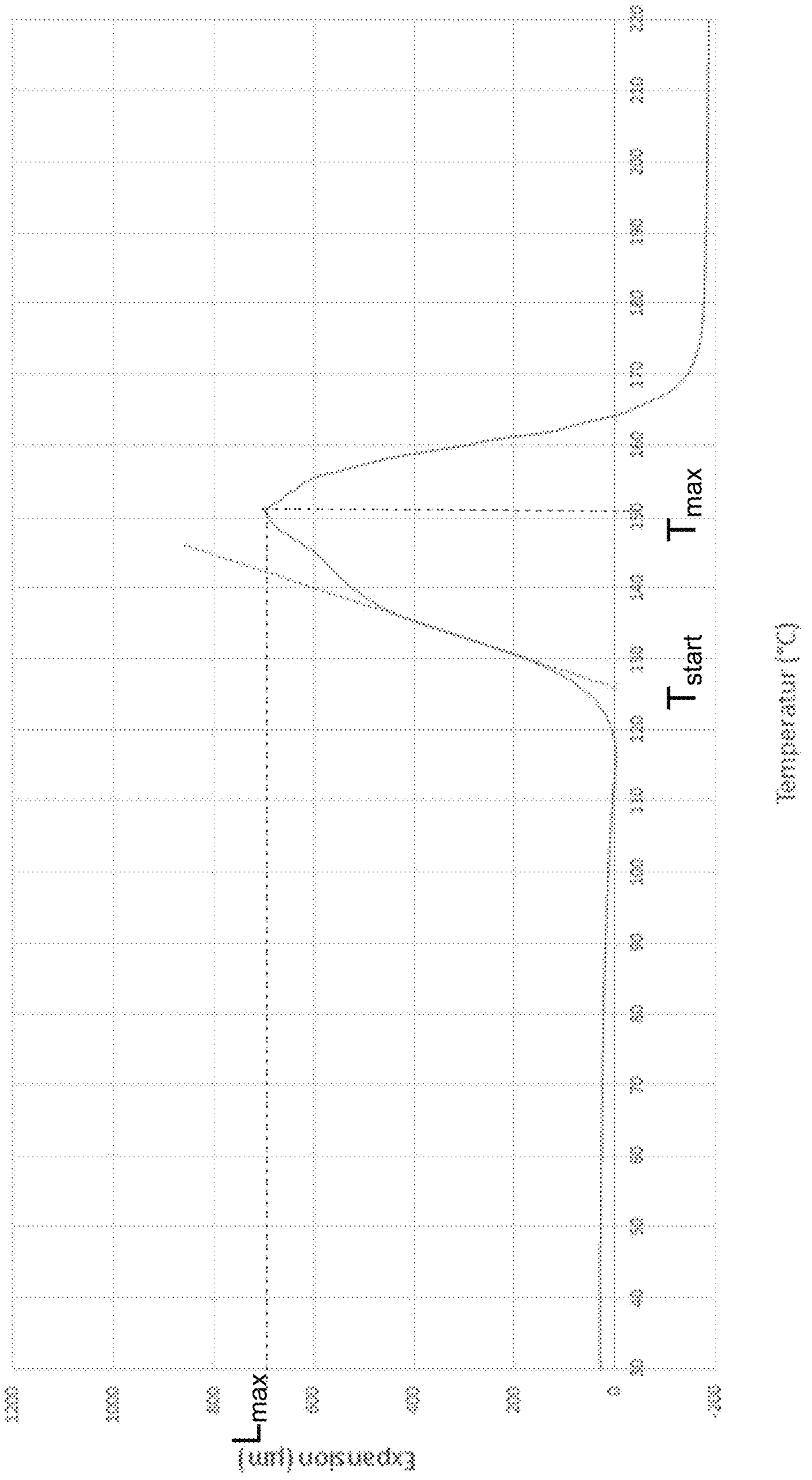
FIG. 2 illustrates determination of $T_{Start}$, $T_{max}$ and $L_{max}$ by thermo-mechanical analysis (TMA).

The thermally expandable microspheres have a temperature at which expansion starts, $T_{Start}$, of from 80° C. to less than 135° C. The temperature at which expansion starts is called $T_{Start}$, while the temperature at which maximum expansion is reached is called $T_{max}$. $T_{Start}$ and $T_{Max}$ may be determined using standard measuring techniques as commonly known by the skilled person. For instance, $T_{Start}$ and $T_{Max}$ can be determined in a temperature ramping experiment, by using for example a Mettler-Toledo Thermomechanical Analyser, such as Mettler-Toledo TMA/SDTA 841e, by using a heating rate of 20° C./min and a load (net.) of 0.06 N. In such a temperature ramping experiment, a sample of known weight of the thermally expandable microspheres is heated with a constant heating rate of 20° C./min under a load (net.) of 0.06 N. When expansion of the thermally expandable microspheres starts, the volume of the sample increases and moves the load upwards. From such measurement, an expansion thermogram (an exemplary thermogram is shown in FIG. 2) is obtained wherein the ordinate indicates the height of moving the load upwards and the abscissa indicates the temperature. $T_{Start}$ and $T_{Max}$ can be determined from this expansion thermogram for instance by using STARe software from Mettler-Toledo.

In embodiments, the thermally expandable microspheres have a $T_{Start}$ in the range of from 90° C. to less than 135° C. A $T_{Start}$ of less than 135° C. may be for instance a $T_{Start}$ of 134° C. or less, 132° C. or less, 130° or less, 125° C. or less or even 120° C. or less. Hence, the thermally expandable microspheres may have a $T_{Start}$ in the range of from 80° C. to 134° C., preferably from 80° C. to 132° C. and more preferably from 80° C. to 130° C. Even more preferably the thermally expandable microspheres have a $T_{Start}$ in the range from 90° C. to 130° C., and most preferably in the range of from 95° C. to 128° C.

In embodiments, to further enhance the properties of the polymer shell, the polymeric shell of the thermally expandable microspheres can comprise a polymer shell enhancer in the form of a crosslinker or a hydrogen bond donor. A crosslinker may react with groups on the carboxylate-functionalised celluloses. A hydrogen bond donor may interact via hydrogen bonds with groups on the carboxylate-functionalised celluloses. Whether a specific compound will react or interact with groups on the carboxylate-functionalised celluloses of the polymeric shell depend on the chemical properties of the compound as well as the process conditions used when preparing the microspheres. By adding a polymer shell enhancer in the form of a crosslinker or a hydrogen bond donor, it is possible to further improve the barrier properties of the polymer shell and to improve the mechanical properties of the polymer shell and thus the expansion properties of the microspheres.

In particular if the polymer shell enhancer is in the form of a crosslinker or a hydrogen bond donor, the polymer shell enhancer is typically a low-molecular weight compound having for instance a molecular weight of less than 2000 g/mol, preferably less than 1500 g/mol, more preferably less than 1000 g/mol and even more preferably less than 500 g/mol. For instance, the polymer shell enhancer may have a molecular weight in the range of 20 to 500 g/mol, preferably between 30 and 400 g/mol, and even more preferably between 40 and 300 g/mol.

In principle, any crosslinker known in the art for crosslinking polymers and preferably any crosslinker which has been described for use for the preparation of expandable microspheres may be used as the crosslinker for preparing the expandable microspheres of the present disclosure. An overview of such potential crosslinkers is for instance provided in EP1288272 A1 and U.S. Pat. No. 6,617,364 B2.

Crosslinkers are polyfunctional compounds having two or more polymerizable functional groups which are suitable for crosslinking a polymer by reacting with functional groups of the polymer to be crosslinked. The polymerizable functional groups of the crosslinker may be for instance carbon-carbon double bonds, such as (meth)acrylates, isocyanates, aldehydes, carbonic acid halides, such as carbonic acid chloride, or anhydrides, epoxides, hydroxyl groups, aldehydes, melamines, etc. These groups may for instance react with suitable functional groups of the polymer to be crosslinked, such as for instance carbon-carbon double bonds, isocyanates, amine groups or hydroxyl groups of the polymer to be crosslinked.

For preparing the expandable microspheres of the present disclosure, preferably difunctional crosslinkers are used, i.e. such crosslinkers which have two functional groups which are suitable for crosslinking a polymer by reacting with functional groups of the polymer to be crosslinked. For instance, the difunctional crosslinker has polymerizable functional groups of the crosslinker as described above. In the context of the present disclosure, the polymer to be crosslinked is the carboxylate-functionalised cellulose.

Hydrogen bond donors are compounds having hydrogen atoms covalently bound to more electronegative atoms or groups, particularly including nitrogen, oxygen and fluorine, where these hydrogen atoms form intermolecular hydrogen bonds with functional groups (hydrogen bond acceptors) of the carboxylate-functionalised cellulose, such as the carboxylate groups, hydroxyl groups and ether groups, in particular the carboxylate groups.

In embodiments, the crosslinker is a crosslinker containing anhydride groups and preferably is a dianhydride crosslinker, i.e. a crosslinker having two anhydride groups.

In embodiments, the dianhydride compound is preferably selected from the group including 1,2,4,5-benzenetetracarboxylic acid dianhydride, benzophenone tetracarboxylic dianhydride, ethylene tetraacetic dianhydride, butane tetracarboxylic dianhydride, ethylenediamine tetraacetic dianydride, 3,3',4,4'-biphenyltetracarboxylic dianhydride, bicyclo [2.2.2]oct-7-ene-2,3,5,6-tetracarboxylic dianhydride, cyclobutane-1,2,3,4-tetracarboxylic dianhydride, 4,4'-oxydiphthalic anhydride and tetrahydrofuran-2,3,4,5-tetracarboxylic dianhydride. More preferably the dianhydride compound is selected from the group including 1,2,4,5-benzenetetracarboxylic acid dianhydride, benzophenone tetracarboxylic dianhydride and ethylene tetraacetic dianhydride, and even more preferably is 1,2,4,5-benzenetetracarboxylic acid dianhydride or benzophenone tetracarboxylic dianhydride. Particularly preferred is that the dianhydride compound is 1,2,4,5-benzenetetracarboxylic acid dianhydride. 1,2,4,5-benzenetetracarboxylic acid dianhydride is also known as and referred herein to as pyromellitic dianhydride.

The polymer shell enhancer is preferably a hydrogen bond donor.

Examples of suitable hydrogen bond donors are hydrolysed anhydrides (e.g. dianhydrides as exemplified above which, however are hydrolysed, i.e. which have undergone hydrolysis); alcohols (e.g. 1,3-butanediol, glycerol, polycaprolactone-triol, pentaerythritol, ascorbic acid, sorbitol, Polyethylene glycol (20) sorbitan monolaurate (also called Tween 20)); amides (e.g. urea, biuret, succinamide) and carboxylic acids (e.g. citric acid, maleic acid, succinic acid, pyromellitic acid, lactic acid, tartaric acid, ethylenediaminetetraacetic acid (EDTA), butane tetra carboxylic acids, such as 1,2,3,4-butane tetra carboxylic acid (BTCA)).

In embodiments, the hydrogen bond donor is a carboxylic acid, i.e. a compound containing at least one carboxylic acid group, such as a monocarboxylic acid, a dicarboxylic acid, a tricarboxylic acid, a tetracarboxylic acid or a polycarboxylic acid, such as a polycarboxylic acid polymer. Preferably the hydrogen bond donor is a carboxylic acid containing at least two carboxylic acid groups (—COOH), particularly a dicarboxylic acid, a tricarboxylic acid or a tetracarboxylic acid.

Examples of monocarboxylic acids are formic acid, acetic acid, propionic acid, butyric acid, valeric acid, caproic acid and lactic acid.

Examples of dicarboxylic acids are adipic acid, maleic acid, succinic acid, tartaric acid and aldaric acid.

Examples of tricarboxylic acids are citric acid and isocitric acid.

Examples of tetracarboxylic acids are pyromellitic acid, ethylenediaminetetraacetic acid (EDTA) and 1,2,3,4-butane tetra carboxylic acid (BTCA).

If the hydrogen-bond donor is a carboxylic acid, the hydrogen-bond donor may have a molecular weight in the range of 20 to 2000 g/mol and preferably has a molecular weight in the range of 20 to 500 g/mol, more preferably between 30 and 400 g/mol, and even more preferably between 40 and 300 g/mol.

Compounds containing anhydride groups, such as a dianhydride compound, may hydrolyse (for instance partly hydrolyse or fully hydrolyse) and then the hydrolysed anhydride group may form intermolecular hydrogen bonds with functional groups of the carboxylate-functionalised cellulose and may then act as a hydrogen bond donor. In embodiments, the hydrogen bond donor is a compound containing hydrolysed anhydride groups and preferably is a hydrolysed dianhydride compound, i.e. a compound having two hydrolysed anhydride groups.

Thus, in embodiments, the hydrogen bond donor may be a compound containing hydrolysed anhydride groups, and preferably may be selected from the group including hydrolysed 1,2,4,5-benzenetetracarboxylic acid dianhydride, hydrolysed benzophenone tetracarboxylic dianhydride, hydrolysed ethylene tetraacetic dianhydride, hydrolysed butane tetracarboxylic dianhydride, hydrolysed ethylenediamine tetraacetic dianydride, hydrolysed 3,3,4,4-biphenyltetracarboxylic dianhydride, hydrolysed bicyclo[2.2.2]oct-7-ene-2,3,5,6-tetracarboxylic dianhydride, hydrolysed cyclobutane-1,2,3,4-tetracarboxylic dianhydride, hydrolysed 4,4-oxydiphthalic anhydride and hydrolysed tetrahydrofuran-2,3,4,5-tetracarboxylic dianhydride. More preferably, the hydrogen bond donor may be selected from the group including hydrolysed 1,2,4,5-benzenetetracarboxylic acid dianhydride, hydrolysed benzophenone tetracarboxylic dianhydride and hydrolysed ethylene tetraacetic dianhydride, and most preferably is hydrolysed 1,2,4,5-benzenetetracarboxylic acid dianhydride or hydrolysed benzophenone tetracarboxylic dianhydride.

The hydrogen bond donor may also be selected from the group including 1,2,4,5-benzenetetracarboxylic acid, citric acid, tartaric acid, 1,2,3,4-butane tetra carboxylic acid (BTCA), and maleic acid.

Particularly, the hydrogen bond donor is selected from the group including 1,2,4,5-benzenetetra-carboxylic acid, citric acid, tartaric acid, 1,2,3,4-butane tetra carboxylic acid (BTCA), and maleic acid.

More particularly, the hydrogen bond donor is selected from the group including 1,2,4,5-benzenetetra-carboxylic acid, citric acid, tartaric acid, and 1,2,3,4-butane tetra carboxylic acid (BTCA).

Preferably, the hydrogen bond donor is a tricarboxylic acid or a tetracarboxylic acid, such as citric acid, 1,2,4,5-benzenetetracarboxylic acid or 1,2,3,4-butane tetra carboxylic acid (BTCA).

In specific embodiments, the hydrogen bond donor is a tetracarboxylic acid, such as 1,2,4,5-benzenetetracarboxylic acid or 1,2,3,4-butane tetra carboxylic acid (BTCA). Most preferred, the hydrogen bond donor is 1,2,3,4-butane tetra carboxylic acid (BTCA).

The amount of the polymer shell enhancer in the form of a crosslinker or a hydrogen bond donor, used for preparing the expandable microspheres of the present disclosure is not particularly limited.

However, in an embodiment the polymer shell enhancer is a crosslinker which is used in an amount of 0.1 to 10 mol of polymerizable functional groups of the crosslinker per 1 mol of functional groups suitable for crosslinking of the carboxylate-functionalised cellulose. This means that the molar ratio of polymerizable functional groups of the crosslinker to functional groups suitable for crosslinking of the carboxylate-functionalised cellulose is in the range of from 0.1/1 (mol/mol) to 10/1 (mol/mol). Preferably the crosslinker is used in an amount of 0.5 to 5 mol of polymerizable functional groups of the crosslinker per 1 mol of functional groups suitable for crosslinking of the carboxylate-functionalised cellulose. Even more preferably the crosslinker is used in an amount of 0.5 to 3 mol of polymerizable functional groups of the crosslinker per 1 mol of functional groups suitable for crosslinking of the carboxylate-functionalised cellulose and most preferably the crosslinker is used in an amount of 1.4 to 2.2 mol of polymerizable functional groups of the crosslinker per 1 mol of functional groups suitable for crosslinking of the carboxylate-functionalised cellulose. The crosslinker may also be used in an amount of 1.5 mol of polymerizable functional groups of the crosslinker per 1 mol of functional groups suitable for crosslinking of the carboxylate-functionalised cellulose.

For instance, in case the polymer shell enhancer is a dianhydride crosslinker, the dianhydride crosslinker (i.e. a crosslinker with two polymerizable functional groups of the crosslinker) is used in an amount of 0.05 to 5 mol of the crosslinker per 1 mol of functional groups suitable for crosslinking of the carboxylate-functionalised cellulose. This means that the molar ratio of dianhydride crosslinker to functional groups suitable for crosslinking of the carboxylate-functionalised cellulose is in the range of from 0.05/1 (mol/mol) to 5/1 (mol/mol). Preferably the dianhydride crosslinker is used in an amount of 0.25 to 2.5 mol of the crosslinker per 1 mol of functional groups suitable for crosslinking of the carboxylate-functionalised cellulose. Even more preferably the dianhydride crosslinker is used in an amount of 0.25 to 1.5 mol of the crosslinker per 1 mol of functional groups suitable for crosslinking of the carboxylate-functionalised cellulose and most preferably the dianhydride crosslinker is used in an amount of 0.7 to 1.1 mol of the crosslinker per 1 mol of functional groups suitable for crosslinking of the carboxylate-functionalised cellulose. The dianhydride crosslinker may also be used in an amount of 0.75 mol of the crosslinker per 1 mol of functional groups suitable for crosslinking of the carboxylate-functionalised cellulose.

The functional groups suitable for crosslinking of the carboxylate-functionalised cellulose are preferably hydroxyl groups. Hence, in a preferred embodiment, a dianhydride crosslinker is used in an amount of 0.05 to 5 mol of the crosslinker per 1 mol of hydroxyl groups of the carboxylate-functionalised cellulose. This means that the molar ratio dianhydride crosslinker to hydroxyl groups of the carboxylate-functionalised cellulose is in the range of from 0.05/1 (mol/mol) to 5/1 (mol/mol). Preferably the dianhydride crosslinker is used in an amount of 0.25 to 2.5 mol of the crosslinker per 1 mol of hydroxyl groups of the carboxylate-functionalised cellulose. Even more preferably the dianhydride crosslinker is used in an amount of 0.25 to 1.5 mol of the crosslinker per 1 mol of hydroxyl groups of the carboxylate-functionalised cellulose and most preferably the dianhydride crosslinker is used in an amount of 0.7 to 1.1 mol of the crosslinker per 1 mol of hydroxyl groups of the carboxylate-functionalised cellulose. The dianhydride crosslinker may also be used in an amount of 0.75 mol of the crosslinker per 1 mol of hydroxyl groups of the carboxylate-functionalised cellulose.

The amount of the polymer shell enhancer which is used, in particular if the polymer shell enhancer is a hydrogen bond donor, may be from 0 to 50 wt % based on the total weight of the polymer shell enhancer and the carboxylate-functionalised cellulose. In embodiments, it can be in the range of from 0.01 to 40 wt %, for example in the range of from 0.1 to 30 wt %, in the range of from 1 to 30 wt % or even in the range of from 5 to 25 wt %, such as in the range of from 10 to 20 wt %, the wt % being based on the total weight of the polymer shell enhancer and the carboxylate-functionalised cellulose.

For instance, if the polymeric shell comprises cellulose acetate propionate (CAP) or cellulose acetate butyrate (CAB), the amount of the polymer shell enhancer which is used, in particular if the polymer shell enhancer is a hydrogen bond donor, may be from 0 to 50 wt % based on the total weight of the polymer shell enhancer and the carboxylate-functionalised cellulose. In embodiments, it can be in the range of from 0.01 to 30 wt %, for example in the range of from 0.1 to 30 wt %, in the range of from 1 to 25 wt % or even in the range of from 2 to 20 wt %, such as in the range of from 5 to 20 wt % or in the range of from 10 to 20 wt %, the wt % being based on the total weight of the polymer shell enhancer and the carboxylate-functionalised cellulose.

In further embodiments, the polymeric shell can comprise particles to improve the mechanical properties and gas barrier of the polymer shell, thus also acting as polymer shell enhancers. Examples of such particles are talc, montmorillonite, nanocrystalline cellulose and various types of clay, such as bentonite.

A number of factors can result in high densities. For example, high density can result from poor microsphere yield, i.e. the percentage of microspheres in the polymeric material is too low to reduce the overall density to an acceptable level. Another issue is poor expansion characteristics, which can arise where too many of the microspheres contain insufficient blowing agent to enable adequate expansion. This can result from the polymer shell being too permeable to the blowing agent, or due to the formation of so-called "multiple core" microspheres where, instead of a single blowing agent-containing core, there are multiple blowing agent-containing cores within the shell (e.g. like a microspherical foam or sponge). In such multi-core microspheres, the blowing agent concentration is typically too low to reduce the density adequately. Another cause is aggregation or agglomeration of the polymer, resulting in poor microsphere production and a denser material. Too high a proportion of aggregated material or poorly expanding microspheres can also lead to large inhomogeneity in the expansion characteristics of the resulting microsphere product. This is particularly unfavourable for surface-sensitive applications such as coatings, where a smooth finish is desirable.

Figure 1B:
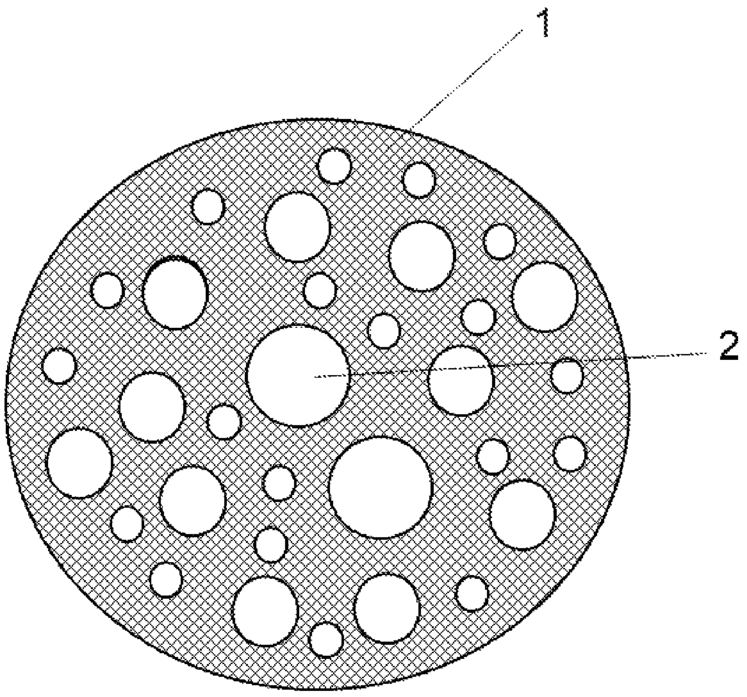

Illustrative cross sections of single core and multi-core microspheres are provided in FIGS. 1A and 1B respectively, where regions of polymer, 1, are represented by the cross-hatched areas, and blowing agent-containing regions, 2, are represented by blank areas.

The one or more blowing agents generally have a boiling point above 25° C. at 5.0 bara pressure or above 25° C. at 3.0 bara pressure, where "bara" stands for bar-absolute. In embodiments, they have a boiling point above 25° C. at atmospheric pressure (1.013 bara). Typically, they have a boiling point of 250° C. or less at atmospheric pressure, for example 220° C. or less, or 200° C. or less. They are preferably inert, and do not react with the functionalised cellulose shell. Boiling points at elevated pressures can be calculated using the Clausius Clapeyron equation.

Examples of blowing agents include dialkyl ethers, alkanes and halocarbons, e.g. chlorocarbons, fluorocarbons or chlorofluorocarbons. In embodiments, the dialkyl ether comprises two alkyl groups each selected from $C_2$ to $C_5$ alkyl groups. In embodiments, the alkane is a $C_4$ to $C_{12}$ alkane. In embodiments, the haloalkane is selected from $C_2$ to $C_{10}$ haloalkanes. The haloalkanes can comprise one or more halogen atoms selected from chlorine and fluorine. The alkyl or haloalkyl groups in the dialkyl ethers, alkanes and haloalkanes can be linear, branched or cyclic. One or a mixture of one or more blowing agents can be used.

In embodiments, for environmental reasons, the one or more blowing agents are selected from alkyl ethers and alkanes, and in further embodiments the one or more blowing agents are selected from alkanes. Haloalkanes are preferably avoided, due to their potential ozone depletion properties, and also due to their generally higher global warming potential.

Examples of suitable blowing agents that can be used include n-pentane, isopentane, neopentane, cyclopentane, cyclohexane, n-butane, isobutane, isohexane, neohexane, heptane, isoheptane, octane, isooctane, isodecane, and isododecane. In preferred embodiments, the blowing agent is selected from $C_4$ to $C_{12}$ iso-alkanes.

In the expandable microspheres, the one or more blowing agents are typically present in an amount of from 5 to 50 wt %, based on the total weight of functionalised cellulose and blowing agent(s), for example in the range of from 5 to 45 wt %, or from 10 to 40 wt %.

Carboxylate-functionalised cellulose materials can be purchased commercially, or can be made by known mechanisms, for example through mixing cellulose with a suitable carboxylic acid in the presence of a strong acid such as sulfuric acid, or by base-catalysed reaction of cellulose with acyl chloride, for example as described in Nishio et al; Cellulose, 2006 (13), 245-259.

In a specific embodiment, the polymeric shell comprises cellulose acetate propionate (CAP) having a number average molecular weight ($M_n$) in the range of from 10,000 to 100,000 Da, such as within the range of 10,000 to 80,000 Da, preferably in the range of from 10,000 to 30,000 Da, and more preferably in the range of from 10,000 to 25,000 Da, the thermally expandable microspheres exhibiting a temperature at which expansion starts, $T_{Start}$, of from 80° C. to less than 135° C.

The amount of the hydrogen bond donor in the form of a carboxylic acid which is used may be from 0 to 50 wt % based on the total weight of the polymer shell enhancer and the carboxylate-functionalised cellulose. In embodiments, it can be in the range of from 0.01 to 40 wt %, for example in the range of from 0.1 to 30 wt %, in the range of from 1 to 30 wt % or even in the range of from 5 to 25 wt %, such as in the range of from 10 to 20 wt %, the wt % being based on the total weight of the polymer shell enhancer and the carboxylate-functionalised cellulose.

For instance, if the polymeric shell comprises cellulose acetate propionate (CAP) or cellulose acetate butyrate (CAB), the amount of the hydrogen bond donor in the form of a carboxylic acid which is used may be from 0 to 50 wt % based on the total weight of the polymer shell enhancer and the carboxylate-functionalised cellulose. In embodiments, it can be in the range of from 0.01 to 30 wt %, for example in the range of from 0.1 to 30 wt %, in the range of from 1 to 25 wt % or even in the range of from 2 to 20 wt %, such as in the range of from 5 to 20 wt % or in the range of from 10 to 20 wt %, the wt % being based on the total weight of the polymer shell enhancer and the carboxylate-functionalised cellulose.

The expandable microspheres of the present disclosure are obtainable by a spray drying process comprising mixing the carboxylate-functionalised cellulose, an organic solvent, the blowing agent and, optionally, the polymer shell enhancer in the form of a crosslinker or a hydrogen bond donor, and then spraying the thus obtained mixture into a drying equipment to produce the thermally expandable microspheres having a polymeric shell surrounding a hollow core, in which the polymeric shell comprises the carboxylate-functionalised cellulose, and the hollow core comprises the blowing agent.

In principle, the spray drying equipment for performing the spray drying process is not limited and any conventional and commercially available spray drying equipment can be used for the spray drying process. A typical spray drying equipment suitable for the process described herein comprises a drying chamber equipped with a nozzle, an inlet for drying gas and an outlet which connects the drying chamber with a cyclone. Through the nozzle which is normally located at the top of the spraying chamber (but may be also located on any other portion of the spray dryer) the liquid to be atomized is sprayed, usually in combination with a spray gas, into the drying chamber. In the drying chamber, the atomized liquid is dried by the drying gas which is fed into the spraying chamber through the inlet for drying gas. The inlet of drying gas may for instance be located besides the nozzle. The atomized liquid dries and forms particles. The thus obtained particles are then fed together with the drying gas through the outlet of the drying chamber which is normally located in the bottom area of the drying chamber into a cyclone. In the cyclone the particles are separated from the drying air. The drying air may be further filtered to remove any residual particles from the drying air.

A suitable spray drying equipment for performing the spray drying process is the Büchi mini spry dryer B-290 which is commercially available from Büchi/Switzerland.

The order of adding the carboxylate-functionalised cellulose, the organic solvent, the blowing agent and, optionally, the polymer shell enhancer in the form of a crosslinker or a hydrogen bond donor, for mixing is not restricted and any order can be chosen.

However, in a preferred embodiment, in the process for producing the expandable microspheres, the carboxylate-functionalised cellulose is mixed first with the organic solvent, and then, in a further step the blowing agent and, optionally, the polymer shell enhancer in the form of crosslinker or a hydrogen bond donor, is added to the mixture.

The mixing of the carboxylate-functionalised cellulose can be carried out at ambient temperature, although temperatures in the range of from 5 to 75° C. can be used. Mixing is usually performed till the carboxylate-functionalised cellulose has completely dissolved in the organic solvent.

In embodiments, the mixture of the carboxylate-functionalised cellulose with the organic solvent can be left or stirred for a period of time, for example from 1 to 100 hours, or from 2 to 50 hours. This can be at temperatures in the range of from 10 to 95° C., for example at a temperature of from 20 to 90° C.

In a further step, the blowing agent and, optionally, the polymer shell enhancer in the form of a crosslinker or a hydrogen bond donor, are added to the mixture of carboxylate-functionalised cellulose and organic solvent. In case a polymer shell enhancer is added, the order of adding the blowing agent and the polymer shell enhancer is not critical and, thus, the blowing agent may be added first, followed by the addition of the polymer shell enhancer or, alternatively, the polymer shell enhancer may be added first, followed by the addition of the blowing agent. Also this mixing step can be carried out at ambient temperature, although temperatures in the range of from 5 to 75° C. can be used. Also this mixing step is usually performed till the blowing agent and, optionally, the polymer shell enhancer has completely dissolved in the organic solvent.

After the addition of the blowing agent and, optionally, the polymer shell enhancer, to the mixture of carboxylate-functionalised cellulose and organic solvent, the thus obtained mixture may be further stirred for a period of time, for example from 1 to 100 hours, or from 2 to 50 hours. Also this can be at temperatures in the range of from 10 to 95° C., for example at a temperature of from 20 to 90° C.

The mixture comprising the carboxylate-functionalised cellulose, the organic solvent, the blowing agent and, optionally, the polymer shell enhancer in the form of a crosslinker or a hydrogen bond donor, is then sprayed into a drying equipment to produce the thermally expandable microspheres as described herein. The drying equipment may be a spray drying equipment as described above.

The optional spray gas that is sprayed through the nozzle together with the liquid to be atomized is not particularly limited and may be any suitable spray gas known by the skilled person. For instance, the spray gas may be selected from nitrogen, carbon dioxide, (pressurized) air, noble gases, such as argon, etc. Preferably, in the method for producing expandable microspheres as described herein a spray gas is used and more preferably this spray gas is nitrogen.

Also the drying gas is not particularly limited and may be any suitable drying gas known by the skilled person. For instance, also the spray gas may be selected from nitrogen, carbon dioxide, (pressurized) air, noble gases, such as argon, etc. Preferably, the drying gas is nitrogen.

Further process parameters for running the spray drying equipment, such as the spray gas flow, the inlet temperature of the drying gas when entering the drying chamber, the feed rate of the liquid to be atomized and the aspirator speed to circulate the drying gas in the spray drying equipment can be readily chosen by the skilled person.

It has been found that with the above-described method it is possible to obtain expandable microspheres comprising a polymeric shell surrounding a hollow core, wherein the hollow core comprises a blowing agent, and the polymeric shell comprises a carboxylate-functionalised cellulose, wherein the thermally expandable microspheres have a temperature at which expansion starts, $T_{Start}$, of from 80° C. to less than 135° C. It has been further found that this method is particularly suitable to obtain such expandable microspheres, wherein the polymeric shell further comprises a polymer shell enhancer in the form of a crosslinker or a hydrogen bond donor, particularly a hydrogen bond donor, such as a carboxylic acid.

The organic solvent can be selected from those having one or more functional group selected from esters, amides, aldehydes, ketones, alcohols (including glycols) and ethers, for example those having 3 to 12 carbon atoms. Esters, ketones and ethers may, in embodiments, be part of a cyclic structure. Further examples include haloalkanes having from 1 to 6 carbon atoms and halo-carboxylic acids having from 1 to 6 carbon atoms, where the halogen is selected from fluorine, chlorine, bromine and iodine.

Examples of organic solvents that can be used include ethyl acetate, ethyl formate, methyl acetate, n-propyl formate, iso-propyl formate, n-propyl acetate, iso-propyl acetate, iso-butyl acetate, n-butyl acetate, n-pentyl formate, iso-pentyl formate, n-pentyl acetate, iso-pentyl acetate, ethyl propionate, iso-butyl iso-butyrate, n-butyl propionate, ethyl 3-ethoxypropionate, 2-ethylhexyl acetate, acetone, methyl ethyl ketone, diethyl ketone, methyl isobutyl ketone, methyl isoamyl ketone, methyl n-amyl ketone, mesityl oxide, acetophenone, cyclohexanone, diethyl phthalate, ethyl lactate, benzyl acetate, butyrolactone, acetyl acetone, methyl cyclohexanone, benzaldehyde, diisobutyl ketone diacetone alcohol, ethylene glycol, glyceryl-α-monochlorohydrin, propylene glycol, glycol ethers (for example propylene glycol monomethyl ether, ethylene glycol mono-methyl ether, ethylene glycol mono-ethyl ether, ethylene glycol mono-n-butyl ether, propylene glycol mono-tert-butyl ether, propylene glycol monopropyl ether, propylene glycol monobutyl ether), glycol ether esters (for example ethylene glycol mono-methyl ether acetate, ethylene glycol mono-ethyl ether acetate, ethylene glycol mono-butyl ether acetate, ethylene glycol diacetate), n-propyl alcohol, iso-propyl alcohol, n-butanol, sec-butanol, isobutanol, benzyl alcohol, diisopropyl ether, dimethoxymethane, dimethoxyethane, 1,4-dioxane, 1,3-dioxolane, tetrahydrofuran, anisole, phenetole and dimethyl formamide Other examples of solvents include dimethyl sulfoxide, toluene, xylene, n-methyl-2-pyrrolidone, methyl chloride, chloroform, carbon tetrachloride, trichloroacetic acid, methyl bromide, methyl iodide, trichloroethylene, and tetrachloroethylene. The organic solvent can be a mixture of two or more solvents. The organic solvent can comprise water, although typically the water content of the organic solvent(s) is less than 5 wt %, i.e. 0 to 5 wt % water, for example 0 to 1 wt % water.

In embodiments, the solvent is selected from one or more of ethyl acetate, methyl acetate, ethyl formate and acetone. Particularly preferred is that the solvent is acetone.

Typically, the carboxylate-functionalised cellulose content in the mixture for spray drying is typically in the range of from 0.1 to 50 wt %. In embodiments, it can be in the range of from 1 to 40 wt %, for example in the range of from 5 to 35 wt % or even from 10 to 30 wt %. The wt % are based on the total weight of the mixture for spray drying.

The amount of blowing agent(s) in the mixture for spray drying is typically in the range of from 0.5 to 50 wt %. In embodiments, it can be in the range of from 0.5 to 40 wt %, for example in the range of from 1 to 30 wt % or even from 5 to 25 wt %. In embodiments, the weight of blowing agent in the mixture for spray drying is equal to or less than the weight of carboxylate-functionalised cellulose, for example the weight ratio of blowing agent to carboxylate-functionalised cellulose can be 1.5 or less, for example 1.3 or less or even 1.1 or less. In embodiments the minimum weight ratio is 0.1, or in further embodiments 0.2. In embodiments, the weight ratio of blowing agent to carboxylate-functionalised cellulose in the organic phase is in the range of from 0.1 to 1.5, such as in the range of from 0.2 to 1.3 or even from 0.3 to 1.1.

The amount of polymer shell enhancer in the form of a crosslinker or hydrogen bond donor, in the mixture for spray drying is typically in the range of from 0 to 15 wt %. In embodiments, it can be in the range of from 0.01 to 15 wt %, for example in the range of from 0.05 to 10 wt %, in the range of from 0.1 to 8 wt % or even in the range of from 1 to 6 wt %. The wt % are based on the total weight of carboxylate-functionalised cellulose, blowing agent, polymer shell enhancer and solvent in the mixture for spray drying.

For instance, if cellulose acetate propionate (CAP) or cellulose acetate butyrate (CAB) is used as polymer, the amount of the polymer shell enhancer which is used may be from 0 to 15 wt %. In embodiments, it can be in the range of from 0.01 to 15 wt %, for example in the range of from 0.05 to 10 wt %, in the range of from 0.1 to 8 wt % or even in the range of from 0.5 to 5.4 wt %. The wt % are based on the total weight of carboxylate-functionalised cellulose, blowing agent, polymer shell enhancer and solvent in the mixture for spray drying.

The amount of the organic solvent adds up to 100 wt %. Preferably, the amount of organic solvent is at least 30 wt %, more preferably at least 40 wt % and even more preferably at least 50 wt %. The wt % are based on the total weight of the mixture for spray drying.

If the polymer shell enhancer is a crosslinker or hydrogen bond donor, in particular a hydrogen bond donor, the amount of the polymer shell enhancer in the mixture for spray drying may also be from 0 to 50 wt % based on the total weight of the polymer shell enhancer and the carboxylate-functionalised cellulose in the mixture for spray drying. In embodiments, it can be in the range of from 0.1 to 40 wt %, for example in the range of from 0.5 to 35 wt %, in the range of from 1 to 30 wt % or even in the range of from 2 to 25 wt %, the wt % being based on the total weight of the polymer shell enhancer and the carboxylate-functionalised cellulose in the mixture for spray drying.

The unexpanded microspheres typically have volume mean particle sizes (diameters), i.e. D(0.5) values, in the range of from 1 to 500 μm, such as 5 to 200 μm or, in embodiments, from 10 to 100 μm or even from 15 to 80 μm.

The expanded microspheres are typically in the range of from 1.5 to 8 times larger in diameter than unexpanded microspheres, for example 2 to 7 times or 3 to 6 times their original diameter.

The particle sizes are suitably measured using light scattering techniques, e.g. laser diffraction, such as low angle laser light scattering (LALLS). They can also be measured by image analysis from a photograph or electronic micrograph image of the pre- or post-expanded microspheres.

To expand the expandable microspheres, they can be heated to a temperature above the higher of the boiling point of the blowing agent and the $T_g$ of the functionalised cellulose, and also a temperature below the melting point of the microspheres. To halt the expansion, the microspheres can be cooled back down to below the $T_g$ of the functionalised cellulose and/or the boiling point of the blowing agent.

Ways of heating the expandable microspheres include direct or indirect contact with a heat transfer medium such as steam or pressurised steam, as described for example in WO2004/056549, WO2014/198532 and WO2016/091847. In further embodiments, direct or indirect contact with other heated gases (e.g. air or nitrogen) optionally mixed with steam can be used. In still further embodiments, where indirect heating is used, a liquid heat transfer medium can be used, e.g. heated oil. In another embodiment, IR radiation can be used to heat the microspheres.

Expansion properties of the thermally expandable thermoplastic microspheres can be evaluated using a thermomechanical analyser (e.g. a Mettler TMA 841) and quantitative data can be obtained from images using suitable software, for example STARe software.

The expandable or expanded thermoplastic microspheres may be provided in unexpanded form, e.g. for expansion local to their point of use, or they can be pre-expanded before dispatch to the point of end use.

The microspheres can find use in many applications, for example in the manufacture of paper (e.g. embossed paper, a paper filler, a sizing agent), inks, corks, cement based compositions, adhesives, foams, insulation materials, coatings, rubber-based products, thermoplastics, thermosets, ceramics, non-woven composite materials, fillers etc. to provide for example a lightweight filler in such applications.

The thermally expandable microspheres described herein can be thermally expanded when dry, when wet or when in a slurry. They are also able to withhold the blowing agent for extended periods of time, e.g. at least 1 week, such as at least one month or at least 4 months. In addition, their expansion is typically irreversible, i.e. cooling the microspheres after thermal expansion does not result in their contraction back to their pre-expanded size.

Another aspect of the present disclosure is a process for preparing thermally expandable microspheres, the process comprising mixing a carboxylate-functionalised cellulose, an organic solvent, a blowing agent and, optionally, a polymer shell enhancer in the form of a crosslinker or a hydrogen bond donor and then spraying the thus obtained mixture into a drying equipment to produce the thermally expandable microspheres having a polymeric shell surrounding a hollow core, in which the polymeric shell comprises the carboxylate-functionalised cellulose, and the hollow core comprises the blowing agent.

The process parameters, the spray drying equipment, the carboxylate-functionalised cellulose, the organic solvent, the blowing agent, the optional polymer shell enhancer in the form of a crosslinker or hydrogen bond donor, as well as amounts thereof are the same as already described above and equally apply for the process according to the second aspect of the present disclosure.

In embodiments, in the process for preparing thermally expandable microspheres, if the polymer shell enhancer is a crosslinker, the crosslinker is added in an amount corresponding to a molar ratio of polymerizable functional groups of the crosslinker to functional groups suitable for crosslinking of the carboxylate-functionalised cellulose in the range of from 0.1/1 (mol/mol) to 10/1 (mol/mol), preferably in the range of from 0.5/1 (mol/mol) to 5/1 (mol/mol), more preferably in the range of from 0.5/1 (mol/mol) to 3/1 (mol/mol), and most preferably in the range of from 1.4/1 (mol/mol) to 2.2/1 (mol/mol).

For instance, in case the polymer shell enhancer is a dianhydride crosslinker, the dianhydride crosslinker (i.e. a crosslinker with two polymerizable functional groups of the crosslinker) is added in an amount corresponding to a molar ratio of crosslinker to functional groups suitable for crosslinking of the carboxylate-functionalised cellulose in the range of from 0.05/1 (mol/mol) to 5/1 (mol/mol), preferably in the range of from 0.25/1 (mol/mol) to 2.5/1 (mol/mol), more preferably in the range of from 0.25/1 (mol/mol) to 1.5/1 (mol/mol), and most preferably in the range of from 0.7/1 (mol/mol) to 1.1/1 (mol/mol).

In a preferred embodiment, a dianhydride crosslinker is added in an amount corresponding to a molar ratio of dianhydride crosslinker to hydroxyl groups of the carboxylate-functionalised cellulose in the range of from 0.05/1 (mol/mol) to 5/1 (mol/mol), preferably in the range of from 0.25/1 (mol/mol) to 2.5/1 (mol/mol), more preferably in the range of from 0.25/1 (mol/mol) to 1.5/1 (mol/mol), and most preferably in the range of from 0.7/1 (mol/mol) to 1.1/1 (mol/mol).

In further embodiments, in the process for preparing thermally expandable microspheres no catalyst, such as amines, for example triethylamine, for crosslinking is added to the mixture to be sprayed into the drying equipment. This may improve the storage stability of the expandable microspheres obtained by the process. Moreover, if no catalyst is used in the process, the obtained microspheres may improve their expanding performance upon storage.

In even further embodiments, in particular if the polymer shell enhancer is an anhydride, the process for preparing thermally expandable microspheres further comprises a step of storing the prepared thermally expandable microspheres after preparation for at least two weeks, and preferably for at least four weeks, before the thermally expandable microspheres are expanded. Surprisingly, it has been found that the storage of the prepared thermally expandable microspheres may improve the expanded density of the thermally expandable microspheres. The expanded density represents the density of the microspheres at maximum expansion of the thermally expandable microspheres. The expanded density can be determined using standard measuring techniques as commonly known by the skilled person. For instance, the expanded density can also be determined in a temperature ramping experiment as described above for the determination of $T_{Start}$, i.e. by using for example a Mettler-Toledo Thermomechanical Analyser, such as Mettler-Toledo TMA/SDTA 841e, and analysis of the obtained expansion thermogram for instance by using STARe software from Mettler-Toledo. A typical value determined for the density using such equipment is called the TMA-density. The TMA-density is calculated using the equation: weight of the sample [g] divided by the volume increase of the sample [$dm^3$] at maximum expansion. A lower TMA-density usually indicate more desirable expansion properties. A TMA density of 0.2 $g/cm^3$ or lower is considered to be desirable and a TMA density of at least 0.15 $g/cm^3$ or lower is considered to be particularly desirable.

In a further aspect, the present disclosure is also directed to thermally expandable microspheres obtained by the process for preparing thermally expandable microspheres as described above.

EXAMPLES

The following examples are intended to illustrate the present disclosure.

The expansion characteristics were evaluated using a Mettler TMA/SDTA 841e thermomechanical analyser, interfaced with a PC running STARe software. The sample to be analysed was prepared from 0.5 mg (+/−0.02 mg) of the thermally expandable microspheres contained in an aluminum oxide crucible with a diameter of 6.8 mm and a depth of 4.0 mm. The crucible was sealed using an aluminum oxide lid with a diameter of 6.1 mm Using a TMA Expansion Probe type, the temperature of the sample was increased from about 30° C. to 240° C. with a heating rate of 20° C./min while applying a load (net.) of 0.06 N with the probe. The displacement of the probe vertically was measured to analyze the expansion characteristics. Initial temperature of expansion ($T_{Start}$): the temperature (° C.) when displacement of the probe is initiated.

Maximum temperature of expansion ($T_{max}$): the temperature (° C.) when displacement of the probe reaches its maximum.

Maximum displacement ($L_{max}$): the displacement (μm) of the probe when displacement of the probe reaches its maximum.

TMA density: sample weight (d) divided by volume increase of the sample ($dm^3$) when displacement of the probe reaches its maximum.

The parameters were determined as illustrated by the illustrative example shown in FIG. 2.

The volatile content in the microspheres was determined using a Mettler Toledo TGA/DSC1 TGA-instrument.

Gas chromatography-flame-ionization detection (GC-FID) analyses have been performed using an Agilent 7697A Headspace in combination with an Agilent 7890A GC.

Differential Scanning calorimetery (DSC) measurements were obtained using a Mettler Toledo DSC 822e device.

General Synthesis Method:

For the experiments of Example 1, a solution of carboxylate-functionalised cellulose polymer in a suitable organic solvent was prepared by dissolving the polymer overnight with the use of a magnetic stirrer.

Blowing agent was added to the solution, and the mixture was stirred for five minutes to re-dissolve any precipitated polymer.

If applicable, polymer shell enhancer was further added to the solution and the mixture was further stirred for ten minutes to dissolve the polymer shell enhancer.

For the experiments of Examples 2-5, all components (solvent, polymer, hydrogen bond donor and blowing agent) were mixed and left to stir overnight.

The thus obtained mixture (for Example 1) was than spray-dried using a Büchi Mini Spray Dryer B-290. Nitrogen was used as spray gas with a feed rate of 238 l/h. The feed rate of the mixture to be spray dried was 9 ml/min. The temperature of the drying gas at the inlet was 70° C. and the aspirator rate was 38 $m^3$/h. The temperature at the outlet was around 52-54° C. and the spraying time was around 4 minutes.

The thus obtained mixture (for Examples 2-5) was than spray-dried using a Büchi Mini Spray Dryer B-290. Nitrogen was used as spray gas with a feed rate of 238 l/h. The feed rate of the mixture to be spray dried was measured to be about 12-13 ml/min. The temperature of the drying gas at the inlet was 70° C. and the aspirator rate was 38 $m^3$/h. The temperature at the outlet was around 52-54° C. and the spraying time was around 4 minutes.

Dried solids were collected from the bottom of the cyclone and analysed within a few days or after storage as indicated in Tables 3, 6 and 7.

Table 1 lists the carboxylate-functionalised cellulose polymers that were used to prepare microspheres. They were either cellulose acetate propionate (CAP) or cellulose acetate butyrate (CAB).

TABLE 1

Carboxylate-functionalised cellulose Details

| Polymer Reference | Source | Hydroxyl Content/ wt % (DS) | Acetate Content/ wt % (DS) | Propionate Content/ wt % (DS) | Butyrate Content/ wt % (DS) | Total DS (1) | Molecular Weight (2) | $T_g$/° C. (3) | $T_m$/° C. (4) |
|---|---|---|---|---|---|---|---|---|---|
| CAP1 | Eastman | 2.6 (0.46) | 2.5 (0.18) | 45 (2.40) | — | 3.04 | 25000 | 142 | 188-210 |
| CAB1 | Sigma Aldrich | 1.3 (0.24) | 17.5 (1.30) | — | 32.5 (1.46) | 3.00 | 12000 | 121 | — |

TABLE 1-continued

| Carboxylate-functionalised cellulose Details | | | | | | | | | |
|---|---|---|---|---|---|---|---|---|---|
| Polymer Reference | Source | Hydroxyl Content/ wt % (DS) | Acetate Content/ wt % (DS) | Propionate Content/ wt % (DS) | Butyrate Content/ wt % (DS) | Total DS (1) | Molecular Weight (2) | $T_g$/° C. (3) | $T_m$/° C. (4) |
| CAB2 | Eastman | 1.5 (0.28) | 13 (0.96) | — | 37 (1.66) | 2.90 | 20000 | 123 | 155-165 |
| CAB3 | Eastman | 1.5 (0.31) | 2 (0.17) | — | 53 (2.64) | 3.12 | 16000 | 85 | 127-142 |

(1) DS = Degree of substitution. Total DS = sum of DS of individual substituents
(2) Number Average Molecular Weight (in Da), as provided by supplier
(3) Glass transition temperature as provided by supplier (Eastman), and other values were measured using the DSC method of Nishio et al, described above
(4) Melting Point, as provided by supplier - not specified/measured

Example 1

Details of the samples that were prepared are shown in Table 2, and data on the resulting microspheres are shown in Table 3.

TABLE 2

| Synthesis Details | | | | | |
|---|---|---|---|---|---|
| Experiment | Polymer (wt) | Solvent (wt) (1) | Blowing Agent (wt) (2) | Polymer shell enhancer (3) | Eq (polymer shell enhancer) (4) |
| 1 | CAP1 (33 g) | Actn (157.2 g) | IO (21.9 g) | none | |
| 2 | CAP1 (22 g) | Actn (104.8 g) | IO (14.6 g) | PMDA (0.742 g) | 0.1 |
| 3 | CAP1 (16.5 g) | Actn (78.6 g) | IO (11.0 g) | PMDA (1.669 g) | 0.3 |
| 4 | CAP1 (16.5 g) | Actn (78.6 g) | IO (11.0 g) | PMDA (2.782 g) | 0.5 |
| 5 | CAB1 (4.9 g) | Actn (20.4 g) | IO (7.4 g) | PMDA (0.4 g) | 0.5 |
| 6 | CAB1 (4.9 g) | Actn (24.5 g) | IO (3.3 g) | PMDA (0.4 g) | 0.5 |
| 7 | CAB1 (4.9 g) | Actn (25.2 g) | IO (2.6 g) | PMDA (0.4 g) | 0.5 |
| 8 | CAB1 (4.9 g) | Actn (25.7 g) | IO (2.1 g) | PMDA (0.4 g) | 0.5 |
| 9 | CAB1 (4.9 g) | Actn (25.2 g) | IO (2.6 g) | PMDA (0.475 g) | 0.59 |
| 10 | CAB1 (4.9 g) | Actn (25.2 g) | IO (2.6 g) | PMDA (0.547 g) | 0.68 |
| 11 | CAB1 (4.9 g) | Actn (25.2 g) | IO (2.6 g) | PMDA (0.620 g) | 0.77 |
| 12 | CAB1 (4.9 g) | Actn (25.2 g) | IO (2.6 g) | PMDA (0.724 g) | 0.90 |
| 13 | CAB1 (4.9 g) | Actn (25.2 g) | IO (2.6 g) | PMDA (0.805 g) | 1.0 |
| 14 | CAB1 (4.9 g) | Actn (25.2 g) | IO (2.6 g) | PMDA (0.966 g) | 1.2 |
| 15 | CAB1 (9.8 g) | Actn (50.4 g) | IO (10.4 g) | BPDT (2.38 g) | 1.0 |
| 16 | CAB1 (4.9 g) | Actn (25.2 g) | IO (5.2 g) | BPDT (0.59 g) | 0.5 |
| 17 | CAB1 (4.9 g) | Actn (25.2 g) | IO (2.6 g) | BPDT (1.19 g) | 1.0 |
| 18 | CAB2 (8.3 g) | Actn (39 g) | IO (5.5 g) | PMDA (0.798 g) | 0.5 |
| 19 | CAB2 (8.3 g) | Actn (36 g) | IO (5.5 g) | PMDA (0.798 g) | 0.5 |
| 20 | CAB2 (8.3 g) | Actn (31 g) | IO (5.5 g) | PMDA (0.798 g) | 0.5 |
| 21 | CAB2 (8.3 g) | Actn (29 g) | IO (5.5 g) | PMDA (0.798 g) | 0.5 |
| 22 | CAB2 (8.3 g) | Actn (27 g) | IO (5.5 g) | PMDA (0.798 g) | 0.5 |

TABLE 2-continued

| Synthesis Details | | | | | |
|---|---|---|---|---|---|
| Experiment | Polymer (wt) | Solvent (wt) (1) | Blowing Agent (wt) (2) | Polymer shell enhancer (3) | Eq (polymer shell enhancer) (4) |
| 23 | CAB2 (8.3 g) | Actn (29 g) | IO (5.5 g) | PMDA (1.12 g) | 0.7 |
| 24 | CAB2 (8.3 g) | Actn (29 g) | IO (5.5 g) | PMDA (1.44 g) | 0.9 |
| 25 | CAB2 (8.3 g) | Actn (33 g) | IO (5.5 g) | PMDA (0.798 g) | 0.5 |
| 26 | CAB2 (8.3 g) | Actn (29 g) | IO (5.5 g) | PMDA (1.76 g) | 1.1 |
| 27 | CAB2 (1.5 g) CAB3 (3.5 g) | Actn (15.0 g) | IO (3.3 g) | PMDA (1.10 g) | 1.06 |

(1) Actn = Acetone
(2) IO = iso-octane
(3) PMDA = pyromellitic dianhydride; BPTD = benzophenone tetracarboxylic dianhydride
(4) Eq = Equivalent; eq (polymer shell enhancer) = ratio of molar amount of the polymer shell enhancer to hydroxyl groups of the carboxylate-functionalised cellulose; for instance an eq (polymer shell enhancer) of 0.5 for a dianhydride compound means that the molar ratio of anhydride groups of the dianhydride compound to hydroxyl groups of the polymer is 1/1.

TABLE 3

| Microsphere Properties | | | | |
|---|---|---|---|---|
| Experiment | TMA Density/g $dm^{-3}$ | Volatile Content/wt % (1) | $T_{start}$/° C. (2) | $T_{max}$/° C. (3) |
| 1 | 358 | 9.4 ‡ | 131 | 167 |
| 2 | 472 | 8.5 | 129 | 158 |
| 3 | 39 | 18.0 | 124 | 159 |
| 3 (4 w)* | 33 | 16 | 131 | 162 |
| 4 | 27 | 18.5 | 121 | 153 |
| 4 (4 w)* | 24 | 18.5 | 129 | 155 |
| 5 | 983 | 22.3 | 106 | 115 |
| 6 | 62 | 14.1 | 117 | 142 |
| 7 | 62 | 10.5 | 115 | 144 |
| 7 (2 w)** | 47 | 9.0 | 119 | 144 |
| 7 (5 w)*** | 46 | 8.9 | 119 | 145 |
| 8 | 63 | 8.7 | 115 | 144 |
| 9 | 42 | 11.5 | 114 | 141 |
| 10 | 32 | 11.9 | 114 | 141 |
| 11 | 23 | 13.7 | 116 | 139 |
| 12 | 26 | 12.1 | 111 | 134 |
| 13 | 25 | 13.3 | 113 | 134 |
| 14 | 22 | 14.4 | 112 | 131 |
| 15 | 75 | 25.7 ‡ | 108 | 132 |
| 16 | 102 | 23.2 ‡ | 107 | 135 |
| 17 | 138 | 13.5 ‡ | 106 | 130 |
| 18 | 409 | 10.2 | 102 | 124 |
| 19 | 277 | 10.8 | 107 | 126 |
| 20 | 252 | 14.0 | 104 | 122 |

TABLE 3-continued

| Microsphere Properties | | | | |
|---|---|---|---|---|
| Experiment | TMA Density/g $dm^{-3}$ | Volatile Content/wt % (1) | $T_{start}$/° C. (2) | $T_{max}$/° C. (3) |
| 21 | 118 | 14.3 | 105 | 125 |
| 22 | 127 | 14.7 | 105 | 123 |
| 23 | 273 | 15.7 | 100 | 112 |
| 24 | 124 | 15.1 | 103 | 113 |
| 25 | 204 | 12.5 | 104 | 124 |
| 25 (4 w)* | 37 | 11.2 | 110 | 137 |
| 26 | 92 | 17.7 | 100 | 120 |
| 26 (4 w)* | 24 | 18.6 | 110 | 127 |
| 27 | 584 | 11.9 | 92 | 100 |
| 27 (4 w)* | 118 | 11.4 | 99 | 115 |

(1) Volatile content of the microspheres, measured by TGA
(2) Temperature at which microspheres began to expand
(3) Temperature at which maximum microsphere expansion observed
*measurement of the properties after four weeks of storage at room temperature
**measurement of the properties after two weeks of storage at room temperature
***measurement of the properties after five weeks of storage at room temperature
‡ measured by GC-FID (gas chromatography - flame-ionization detection)

These data reveal that the carboxylate-functionalised cellulose compositions can be used to make bio-based microspheres having a temperature at which expansion starts, $T_{Start}$, of from 80° C. to less than 135° C. and favorable expansion properties. In general, microspheres of higher quality are obtained when additionally a polymer shell enhancer such as PMDA or BPDT is used for the preparation the microspheres. Moreover, the microspheres of Experiments 3, 4, 7 and 26-28 show that storage over two or even four weeks significantly improves the density characteristics of the microspheres. At the same time there is no substantial loss of expansion performance.

Example 2

The influence of various dosages of different polymer shell enhancers on $T_{Start}$, $T_{max}$ and the TMA density was examined using CAP1 as the polymer for the polymer shell.

The mixtures of all experiments of Example 2 contained 5.5 g CAP1, 32 g acetone and 3.65 g Isooctane (i.e. 40 wt % based on the total weight of isooctane and CAP1). Polymer shell enhancers were added in various dosages from 5 to 40 wt % (based on the total weight of polymer shell enhancer and CAP1) as indicated in Table 4. (PMA=Pyromellitic acid; BTCA=1,2,3,4-Butane tetracarboxylic acid).

TABLE 4

| Microsphere properties | | | | | | |
|---|---|---|---|---|---|---|
| Experiment | Polymer shell enhancer | Dosage [wt %] (1) | Encapsulated amount of isooctane [wt %] (2) | $T_{start}$/° C. | $T_{max}$/° C. | TMA-density/ g $dm^{-3}$ |
| 28 | PMA | 5 | 12.7 | 131 | 161 | 84 |
| 29 | PMA | 10 | 18.5 | 128 | 159 | 32 |
| 30 | PMA | 15 | 20.6 | 127 | 152 | 26 |
| 31 | PMA | 20 | 20.1 | 125 | 138 | 52 |
| 32 | PMA | 25 | 16.8 | 128 | 153 | 38 |
| 33 | Citric acid | 5 | 10.0 | 126 | 152 | 166 |
| 34 | Citric acid | 10 | 16.2 | 119 | 154 | 37 |
| 35 | Citric acid | 15 | 19.0 | 113 | 141 | 33 |
| 36 | Citric acid | 20 | 20.9 | 106 | 133 | 40 |
| 37 | Citric acid | 25 | 20.9 | 99 | 120 | 36 |
| 38 | Citric acid | 30 | 20.1 | 93 | 114 | 33 |
| 39 | Citric acid | 40 | 18.2 | 115 | 126 | 475 |
| 40 | Tartaric acid | 5 | 12.5 | 125 | 151 | 119 |
| 41 | Tartaric acid | 10 | 17.2 | 118 | 150 | 40 |
| 42 | Tartaric acid | 15 | 19.7 | 110 | 137 | 31 |
| 43 | Tartaric acid | 20 | 16.3 | 126 | 143 | 164 |
| 44 | Tartaric acid | 25 | 16.9 | 125 | 141 | 271 |
| 45 | Tartaric acid | 30 | 15.9 | 125 | 139 | 187 |
| 46 | BTCA | 5 | 14.6 | 129 | 157 | 105 |
| 47 | BTCA | 10 | 20.5 | 123 | 152 | 32 |
| 48 | BTCA | 15 | 22.0 | 118 | 145 | 33 |
| 49 | BTCA | 20 | 20.9 | 115 | 140 | 32 |
| 50 | BTCA | 25 | 21.2 | 108 | 132 | 31 |
| 51 | BTCA | 30 | 20.0 | 105 | 127 | 38 |
| 52 | Maleic acid | 10 | 13.7 ‡ | 110 | 130 | 317 |
| 53 | Maleic acid | 15 | 14.3 ‡ | 107 | 126 | 60 |
| 54 | Urea | 5 | 12.9 | 124 | 145 | 491 |
| 55 | Urea | 10 | 18.1 | 125 | 142 | 459 |
| 56 | Urea | 15 | 23.7 | 123 | 141 | 195 |
| 57 | Ascorbic acid | 15 | 11.8 | 126 | 148 | 460 |
| 58 | Succinic acid | 10 | 16.8 | 124 | 132 | 748 |
| 59 | Succinic acid | 15 | 25.4 | 124 | 132 | 497 |

(1) based on the total weight of polymer shell enhancer and CAP1
(2) Volatile content of the microspheres, measured by TGA; based on the total weight of the microspheres
‡ measured by GC-FID (gas chromatography - flame-ionization detection)

Example 3

The influence of various dosages of different polymer shell enhancers on $T_{Start}$, $T_{max}$ and the TMA density was examined using CAB2 as the polymer for the polymer shell.

The mixtures of all experiments of Example 3 contained 5 g CAB2 and 3.3 g isooctane. For the experiments with citric acid, tartaric acid and BTCA, the CAB2 was dissolved in 19.8 g acetone. In the experiments with PMA, the CAB2 was dissolved in 20.8 g acetone (dosage 10%), in 31.8 g acetone (dosage 15%) and 39.8 g acetone (dosage 20%). Polymer shell enhancers were added in various dosages from 10 to 20 wt % (based on the total weight of polymer shell enhancer and CAB2) as indicated in Table 4. (PMA=Pyromellitic acid; BTCA=1,2,3,4-Butane tetracarboxylic acid).

TABLE 5

Microsphere properties

| Experiment | Polymer shell enhancer | Dosage [wt %] (1) | Encapsulated amount of isooctane (2) | $T_{start}$/° C. | $T_{max}$/° C. | TMA-density/ g $dm^{-3}$ |
|---|---|---|---|---|---|---|
| 60 | PMA | 10 | 17.5 | 109 | 133 | 47 |
| 61 | PMA | 15 | 13.1 | 111 | 131 | 30 |
| 62 | PMA | 20 | 9.5 | 114 | 131 | 50 |
| 63 | Citric acid | 10 | 17.4 | 100 | 124 | 66 |
| 64 | Citric acid | 15 | 19.8 | 94 | 118 | 32 |
| 65 | Citric acid | 20 | 20.9 | 89 | 107 | 47 |
| 66 | BTCA | 10 | 19.1 | 104 | 129 | 48 |
| 67 | BTCA | 15 | 21.6 | 101 | 122 | 33 |
| 68 | BTCA | 20 | 22.8 | 98 | 116 | 40 |

(1) based on the total weight of polymer shell enhancer and CAB2
(2) Volatile content of the microspheres, measured by TGA The data obtained in Examples 2 and 3 reveal that the carboxylate-functionalised cellulose compositions can be used to make bio-based microspheres having a temperature at which expansion starts, $T_{Start}$, of from 80° C. to less than 135° C. and a desirably low TMA-density. The data further shows that by adjusting the amount of added polymer shell enhancer, microspheres with a particularly low TMA-density can be obtained.

Example 4

Storage tests were performed in order to assess the storage stability of the microspheres of the present disclosure after storage for 4 weeks. Table 6 shows the properties $T_{Start}$, $T_{max}$ and the TMA-density of the microspheres from the experiments of above Example 2 after storage for 4 weeks. For instance, the data provided above in Table 4 for Experiment 28 from Example 2 is for newly made microspheres and the data provided below in Table 6 for corresponding experiment 28 (4 w) is for the very same microspheres with the only difference that it has been measured after 4 week of storage of the microspheres.

TABLE 6

Microsphere properties of the microspheres of Example 2 after 4 weeks storage

| Experiment | Polymer shell enhancer | Dosage [wt %] (1) | Encapsulated amount of isooctane [wt %] (2) | $T_{start}$/° C. | $T_{max}$/° C. | TMA-density/ g $dm^{-3}$ |
|---|---|---|---|---|---|---|
| 28 (4 w) | PMA | 5 | 8.7 | 131 | 158 | 174 |
| 29 (4 w) | PMA | 10 | 15.6 | 129 | 159 | 35 |
| 30 (4 w) | PMA | 15 | 19.7 | 128 | 153 | 23 |
| 31 (4 w) | PMA | 20 | 18.1 | 125 | 138 | 54 |
| 32 (4 w) | PMA | 25 | 15.4 | 127 | 151 | 44 |
| 33 (4 w) | Citric acid | 5 | 6.6 | 129 | 149 | 582 |
| 34 (4 w) | Citric acid | 10 | 11.8 | 120 | 157 | 47 |
| 35 (4 w) | Citric acid | 15 | 14.7 | 113 | 145 | 34 |
| 36 (4 w) | Citric acid | 20 | 19.1 | 107 | 132 | 29 |
| 37 (4 w) | Citric acid | 25 | 17.5 | 100 | 122 | 28 |
| 38 (4 w) | Citric acid | 30 | 17.1 | 94 | 114 | 32 |
| 39 (4 w) | Citric acid | 40 | — | — | — | — |

TABLE 6-continued

Microsphere properties of the microspheres of Example 2 after 4 weeks storage

| Experiment | Polymer shell enhancer | Dosage [wt %] (1) | Encapsulated amount of isooctane [wt %] (2) | $T_{start}$/° C. | $T_{max}$/° C. | TMA-density/ g $dm^{-3}$ |
|---|---|---|---|---|---|---|
| 40 (4 w) | Tartaric acid | 5 | 6.6 | 127 | 149 | 469 |
| 41 (4 w) | Tartaric acid | 10 | 11.0 | 118 | 150 | 51 |
| 42 (4 w) | Tartaric acid | 15 | 13.2 | 112 | 146 | 35 |
| 43 (4 w) | Tartaric acid | 20 | 14.3 | 132 | 144 | 139 |
| 44 (4 w) | Tartaric acid | 25 | 14.4 | 132 | 141 | 286 |
| 45 (4 w) | Tartaric acid | 30 | 12.0 | 133 | 142 | 516 |
| 46 (4 w) | BTCA | 5 | 7.5 | 131 | 156 | 325 |
| 47 (4 w) | BTCA | 10 | 15.7 | 124 | 155 | 33 |
| 48 (4 w) | BTCA | 15 | 20.7 | 118 | 148 | 39 |
| 49 (4 w) | BTCA | 20 | 20.6 | 113 | 138 | 43 |
| 50 (4 w) | BTCA | 25 | 20.7 | 107 | 131 | 31 |
| 51 (4 w) | BTCA | 30 | 19.8 | 103 | 126 | 31 |
| 52 (4 w) | Maleic acid | 10 | — | — | — | — |
| 53 (4 w) | Maleic acid | 15 | 6.3 | 109 | 127 | 289 |

(1) based on the total weight of polymer shell enhancer and CAP1
(2) Volatile content of the microspheres, measured by TGA; based on the total weight of the microspheres
— not determined The data reveal that although the microspheres slightly loose blowing agent over storage for 4 weeks, the expansion properties $T_{Start}$, $T_{max}$ and the TMA-density surprisingly do not significantly change and in some cases even improve. This shows the desirable storage stability of the microspheres of the present disclosure.

Example 5

Further storage tests were performed with the microspheres of above Example 3 in the same manner as in above Example 4. The results are summarized in Table 7.

TABLE 7

Microsphere properties of the microspheres of Example 3 after 4 weeks storage

| Experiment | Polymer shell enhancer | Dosage [wt %] (1) | Encapsulated amount of isooctane [wt %] (2) | $T_{start}$/° C. | $T_{max}$/° C. | TMA-density/ g $dm^{-3}$ |
|---|---|---|---|---|---|---|
| 60 | PMA | 10 | 12.2 | 110 | 135 | 36 |
| 61 | PMA | 15 | 10.9 | 111 | 134 | 33 |
| 62 | PMA | 20 | 8.3 | 114 | 133 | 85 |
| 63 | Citric acid | 10 | 8.6 | 102 | 128 | 79 |
| 64 | Citric acid | 15 | 11.9 | 95 | 120 | 35 |
| 65 | Citric acid | 20 | 15.1 | 90 | 111 | 37 |
| 66 | BTCA | 10 | 13.4 | 104 | 130 | 42 |
| 67 | BTCA | 15 | 18.6 | 101 | 121 | 38 |
| 68 | BTCA | 20 | 22.3 | 99 | 117 | 35 |

(1) based on the total weight of polymer shell enhancer and CAB2
(2) Volatile content of the microspheres, measured by TGA; based on the total weight of the microspheres While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the various embodiments in any way. Rather, the foregoing detailed description will provide those skilled in the art with a convenient road map for implementing an exemplary embodiment as contemplated herein. It being understood that various changes may be made in the function and arrangement of elements described in an exemplary embodiment without departing from the scope of the various embodiments as set forth in the appended claims.

What is claimed is:

1. Thermally expandable microspheres comprising a polymeric shell surrounding a single hollow core, wherein the single hollow core comprises a $C_4$ to $C_{12}$ iso-alkane blowing agent, and the polymeric shell comprises a carboxylate-functionalised cellulose, wherein the thermally expandable microspheres have a temperature at which expansion starts, $T_{Start}$, of from 89° C. to 128° C., wherein the polymeric shell further comprises a polymer shell enhancer in the form of a crosslinker or a hydrogen bond donor, wherein if the cross-linker is utilized, the crosslinker is 1,2,4,5-benzenetetracarboxylic acid dianhydride (PMDA) or benzophenone tetracarboxylic dianhydride (BPDT);

wherein a molar ratio of polymerizable functional groups of the crosslinker to functional groups suitable for crosslinking of the carboxylate-functionalised cellulose is from 0.3/1 (mol/mol) to 1.2/1 (mol/mol);

wherein if the hydrogen bond donor is utilized, the hydrogen bond donor is 1,2,3,4-butanetetracarboxylic acid (BTCA), 1,2,4,5-benzenetetracarboxylic acid (PMA), or citric acid;

wherein an amount of the hydrogen bond donor is from 10 to 20 wt %, the wt % being based on the total weight of the polymer shell enhancer and the carboxylate-functionalised cellulose;

wherein the carboxylate-functionalised cellulose is a cellulose acetate propionate (CAP) having a number average molecular weight ($M_n$) in the range of from 2,000 to 30,000 Da or a cellulose acetate butyrate (CAB) having a number average molecular weight ($M_n$) in the range of from 2,000 to 30,000 Da;

wherein the microspheres have a TMA density of from 22 to 127 g $dm^{-3}$; and wherein an amount of the $C_4$ to $C_{12}$ iso-alkane blowing agent present in the microspheres after four weeks of storage is at least 70% and up to less than 100% of a weight of the original amount of the $C_4$ to $C_{12}$ iso-alkane blowing agent present in the microspheres.

2. The thermally expandable microspheres according to claim 1, wherein the molar ratio of the polymerizable functional groups of the crosslinker to the functional groups suitable for crosslinking of the carboxylate-functionalised cellulose is from 0.3/1 (mol/mol) to 0.5/1 (mol/mol).

3. The thermally expandable microspheres according to claim 1, wherein the molar ratio of the polymerizable functional groups of the crosslinker to the functional groups suitable for crosslinking of the carboxylate-functionalised cellulose is from 0.5/1 (mol/mol) to 0.9/1 (mol/mol).

4. The thermally expandable microspheres according to claim 1, wherein the molar ratio of the polymerizable functional groups of the crosslinker to the functional groups suitable for crosslinking of the carboxylate-functionalised cellulose is from 0.9/1 (mol/mol) to 1.2/1 (mol/mol).

5. The thermally expandable microspheres according to claim 1, wherein the cross-linker is utilized, and the cross-linker is the 1,2,4,5-benzenetetracarboxylic acid dianhydride (PMDA).

6. The thermally expandable microspheres according to claim 2, wherein the cross-linker is utilized, and the cross-linker is the 1,2,4,5-benzenetetracarboxylic acid dianhydride (PMDA).

7. The thermally expandable microspheres according to claim 3, wherein the cross-linker is utilized, and the cross-linker is the 1,2,4,5-benzenetetracarboxylic acid dianhydride (PMDA).

8. The thermally expandable microspheres according to claim 4, wherein the cross-linker is utilized, and the cross-linker is the 1,2,4,5-benzenetetracarboxylic acid dianhydride (PMDA).

9. The thermally expandable microspheres according to claim 1, wherein the hydrogen bond donor is utilized, the hydrogen bond donor is the 1,2,4,5-benzenetetracarboxylic acid (PMA) and the amount of the hydrogen bond donor is 10 wt %, the wt % being based on the total weight of the polymer shell enhancer and the carboxylate-functionalised cellulose.

10. The thermally expandable microspheres according to claim 1, wherein the hydrogen bond donor is utilized, the hydrogen bond donor is the 1,2,4,5-benzenetetracarboxylic acid (PMA) and the amount of the hydrogen bond donor is 15 wt %, the wt % being based on the total weight of the polymer shell enhancer and the carboxylate-functionalised cellulose.

11. The thermally expandable microspheres according to claim 1, wherein the hydrogen bond donor is utilized, the hydrogen bond donor is the 1,2,4,5-benzenetetracarboxylic acid (PMA) and the amount of the hydrogen bond donor is 20 wt %, the wt % being based on the total weight of the polymer shell enhancer and the carboxylate-functionalised cellulose.

12. The thermally expandable microspheres according to claim 1, wherein the carboxylate-functionalised cellulose is the cellulose acetate propionate (CAP) having a number average molecular weight ($M_n$) in the range of from 25,000 to 30,000 Da.

13. The thermally expandable microspheres according to claim 5, wherein the carboxylate-functionalised cellulose is the cellulose acetate propionate (CAP) having a number average molecular weight ($M_n$) in the range of from 25,000 to 30,000 Da.

14. The thermally expandable microspheres according to claim 1, wherein the carboxylate-functionalised cellulose is the cellulose acetate butyrate (CAB) having a number average molecular weight ($M_n$) in the range of from 12,000 to 20,000 Da.

15. The thermally expandable microspheres according to claim 5, wherein the carboxylate-functionalised cellulose is the cellulose acetate butyrate (CAB) having a number average molecular weight ($M_n$) in the range of from 12,000 to 20,000 Da.

16. The thermally expandable microspheres according to claim 1, wherein the microspheres have the TMA density of from 22 to 52 g $dm^{-3}$.

17. The thermally expandable microspheres according to claim 1, wherein if the cross-linker is utilized, the crosslinker is the 1,2,4,5-benzenetetracarboxylic acid dianhydride (PMDA);

wherein if the hydrogen bond donor is utilized, the hydrogen bond donor is the 1,2,3,4-butanetetracarboxylic acid (BTCA) or the 1,2,4,5-benzenetetracarboxylic acid (PMA);

wherein the carboxylate-functionalised cellulose is the cellulose acetate propionate (CAP) having a number average molecular weight ($M_n$) in the range of from 25,000 to 30,000 Da or the cellulose acetate butyrate (CAB) having a number average molecular weight ($M_n$) in the range of from 12,000 to 20,000 Da; and wherein the microspheres have the TMA density of from 22 to 92 g $dm^{-3}$.

18. The thermally expandable microspheres according to claim 1, wherein if the cross-linker is utilized, the crosslinker is the 1,2,4,5-benzenetetracarboxylic acid dianhydride (PMDA);

wherein if the hydrogen bond donor is utilized, the hydrogen bond donor is the 1,2,3,4-butanetetracarboxylic acid (BTCA) or the 1,2,4,5-benzenetetracarboxylic acid (PMA);

wherein the carboxylate-functionalised cellulose is the cellulose acetate propionate (CAP) having a number average molecular weight ($M_n$) in the range of from 25,000 to 30,000 Da or the cellulose acetate butyrate (CAB) having a number average molecular weight ($M_n$) in the range of from 12,000 to 20,000 Da; and wherein the microspheres have the TMA density of from 22 to 52 g $dm^{-3}$.

19. A process for preparing the thermally expandable microspheres of claim 1, the process comprising mixing the carboxylate-functionalised cellulose, an organic solvent, the $C_4$ to $C_{12}$ iso-alkane blowing agent and, the polymer shell enhancer to form a mixture and then spraying the thus obtained mixture into a drying equipment to produce the thermally expandable microspheres.

20. The process according to claim 19, further comprising a step of storing the prepared thermally expandable microspheres after preparation for at least about four weeks before the thermally expandable microspheres are expanded.

* * * * *